United States Patent [19]
Woodland

[11] Patent Number: 5,927,648
[45] Date of Patent: Jul. 27, 1999

[54] AIRCRAFT BASED SENSING, DETECTION, TARGETING, COMMUNICATIONS AND RESPONSE APPARATUS

[76] Inventor: Richard Lawrence Ken Woodland, 562 Fermoy St., Victoria, British Columbia, Canada, V82 6NZ

[21] Appl. No.: 08/731,684

[22] Filed: Oct. 17, 1996

[51] Int. Cl.$^6$ ....................................................... B64C 1/00
[52] U.S. Cl. .................................... 244/118.1; 244/118.2; 244/129.1
[58] Field of Search ............................. 244/118.2, 137.1, 244/137.4, 118.1, 129.1, 129.5; 89/1.54, 1.58, 1.59, 37.16, 37.17, 37.21, 37.22

[56] References Cited

U.S. PATENT DOCUMENTS

| | | | |
|---|---|---|---|
| 2,520,317 | 8/1950 | Laddon et al. | 89/1.59 |
| 2,858,774 | 11/1958 | Batten | 244/137.1 |
| 2,993,413 | 7/1961 | McCormack | 244/137.1 |
| 4,114,839 | 9/1978 | Sibley et al. | 244/118.1 |
| 4,154,416 | 5/1979 | Bruce et al. | 244/129.5 |
| 4,162,776 | 7/1979 | Sibley et al. | 244/118.1 |
| 4,509,709 | 4/1985 | Utton et al. | 244/118.1 |
| 4,588,147 | 5/1986 | Lindsey | 244/118.1 |
| 4,593,288 | 6/1986 | Fitzpatrick | 244/118.1 |
| 4,635,067 | 1/1987 | Fitzpatrick | 244/137.4 |

*Primary Examiner*—Charles T. Jordan
*Assistant Examiner*—Tien Dinh
*Attorney, Agent, or Firm*—Roddy M. Bullock

[57] ABSTRACT

The system and apparatus of this invention provides for a rapidly loaded, palletized, non-dedicated fixed or rotary wing aircraft based, manned observation, sensor launch system, with self-powered sensing and targeting pod, multi-frequency antenna array, and with C4I analysis and control capabilities. The system may be used to deploy and manipulate autonomous and remote control vehicles, for the purpose of recovering and protecting persons in peril; containing/remediating toxic spills; sensing/detection; fire fighting; ship towing; or surface based refueling and support. Although not the primary purpose, this system can also be used for to support an offensive weapons system which could be used to selectively eliminate various targets with a standoff delivery capability. The system and apparatus of the present invention is generally comprised of a removable pallet assembly adapted for loading into, and mounting to the floor of, the interior of the aircraft; a seating assembly moveably mounted to the pallet assembly; an integrated door assembly retractably mounted to the pallet assembly and adapted fit into an opening in the aircraft upon removal of the aircraft side door member, the integrated door assembly having a door frame defining a periphery; at least one remote sensing pod retractably attached to the door frame adapted for deployment from the interior of the aircraft to the exterior of the aircraft; at least one radar member retractably attached to the door frame adapted for deployment from the interior of the aircraft to the exterior of the aircraft; at least one antenna array retractably attached to the door frame adapted for deployment from the interior of the aircraft to the exterior of the aircraft; and control means for coordinating the members and functions of the apparatus.

9 Claims, 11 Drawing Sheets

AIRCRAFT BASED SENSING, DETECTION, TARGETING, COMMUNICATIONS AND RESPONSE APPARATUS

FIELD OF THE INVENTION

This invention relates to removably-mounted, modular, aircraft-based systems for sensing, detection, targeting, communications and response.

BACKGROUND OF THE INVENTION

Aircraft-based platforms are ideally suited for time sensitive emergency, as well as routine, sensing and aerial photographic or other electronic based response activities which as a result of mission performance criteria, require precise location of various types of benign and hostile targets. The nature of the varied mission requirements dictate the type of response which must be coupled to the detection and targeting capabilities of the sensor system. Typically, sophisticated airborne sensor and photographic systems like those commonly used in military or civilian fixed and rotary wing airplanes mandate the modification of the aircraft airframes to accommodate unique systems elements, such as optics, and electronic antenna arrays. These types of systems are commonly used to undertake aerial cartography, bathymetric surveying, geological surveying, search and rescue, police surveillance, communications jamming, military intelligence, mine detection, (terrestrial and marine), missile detection, toxic spill pollution detection and other types of aerial remote sensing and photography.

As the development of sensor systems fast outpaces the airframes which are currently modified to accommodate them, a means to incorporate the rapidly changing varieties of optical and antenna configurations is essential if front-line civilian, or military sensing capability is to keep pace with the latest sensor technology available. Although specialized companies like Lockheed-Martin Aeronautical Systems of Marietta, Ga., USA, have developed replaceable wing fuel sensor pods called "Samson pods" for C-130 aircraft which are capable of housing a wide array of electronic sensing systems, the "Samson pod" still takes several hours to mount or dismount. Further, the "Samson pod" does not lend itself to rapid sensor modification or photographic film replacement while in flight or on the ground. Neither do such semi-dedicated systems benefit from direct hardwiring to the aircraft operator and usually depend on infra-red telemetry which can be adversely affected by cloud, rain, snow or other airborne moisture between the sensing pod and the portable window mounted antenna designed to receive said telemetry.

Other shortcomings of current sensing, targeting and communications exist, including the necessary observation systems to facilitate human observation and control. For example, current observation systems like those manufactured for the Canadian Armed Forces by CAE Aviation of Edmonton, Alberta, Canada, suffer from poor ergonomics design and do not permit the observer an opportunity to extend their vision beyond the aircraft periphery without assuming some uncomfortable posture not conducive to normal seated activities undertaken by the rest of the flight crew. Where protruding window or door observation systems have been incorporated in the past, basic heat and air conditioning for the observer have been omitted and are usually airframe specific prohibiting rapid transfer between aircraft. Where control of detection, targeting devices or remote/autonomous vehicle control are concerned, the system operator is frequently removed from direct manned observation and located in a part of the aircraft which prohibits simultaneous visual observation and system manipulation.

Also, in existing search and rescue, surveillance, or toxic spill response based observation systems, a standardized type "A", "B", or "C" size marine sensor deployment system typical of those manufactured by Sparton Electronics, of Michigan, USA, which can eject smoke markers, illumination flares, or other commonly used Sonotube deployment products are neither inter-platform portable, nor are they based on the Geographic Positioning System (GPS). Further, type "A", "B", or "C" Sonotube telemetry systems are not correlated directly to a Geographic Information System (GIS), similar to the "CANSARP" or CASP software programs used by the Canadian Department of Defense (DOD) and U.S. Coast Guard (USCG) for search and rescue drift model trajectory mapping, or OILMAP Produced by Applied Science Associates of the USA. Neither do existing Sonotube launch systems incorporate a push button GPS and GIS linked launch mechanism which is activated from the observer's chair. Where a Sonotube type launch system does exist on "P-3 Orion" type marine patrol aircraft manufactured by Lockheed-Martin Aeronautical Systems, or other Sonotube launch equipped aircraft from other manufacturers, the systems are not inter-aircraft portable, and generally incorporate highly proprietary, mission-specific electronics which do not lend themselves to rapidly changing, air deployed sensor telemetry based analysis capabilities.

Current communication systems are generally frequency specific and hinder applications where a need exists to communicate with land, sea or air based platforms over a wide spectrum of frequencies. In one particular instance over the gulf of Alaska, a downed U.S. Navy P-3 Orion crew were seriously compromised when the rescue aircraft could not establish communications with a Russian trawler only ten miles away. Although specialized multi-frequency communications and intelligence platforms exist like the U.S Air Force's Airborne Warning And Control System (AWACS) aircraft, or other similar function variants like the C-130 AWACS produced by Lockheed-Martin Aeronautical Systems of Marietta, Ga., USA, they are extremely expensive to acquire and operate, are military mission specific, and are not inter-aircraft portable.

Further, a telemetry and communications problem exists at high rates of aircraft roll, especially at high geographic latitudes, where satellite based telemetry, communications, and data transmission can be interrupted. This problem is typically compensated for by utilizing a pair of flat patch array antennas mounted on opposing sides of the airframe which create a hysteresis region of antenna coverage above the aircraft, but this mandates the dedicated mounting of a pair of antennas on either side of the aircraft's upper fuselage. Also, the antennas do not typically have the provision to integrate other types of communication antenna media into a common undedicated airframe. Further, existing antenna systems do not possess an integrated and portable suite of positioning capabilities comprised of GPS, Pitot tubes, or altimeters for specific geographic aircraft position referenced data essential for determining and recording where deployed sensor or response hardware needs to, or has been deployed. The need for an integrated non dedicated aircraft based multi-frequency communications antenna array with satellite based antenna hysteresis coverage and self locating GPS capability, currently has not been met by the international aviation industry.

An important element of an aircraft based sensing, detection, targeting and response apparatus is a Command, Communications, Control, Computer, and Intelligence (C4I) capability which includes the manipulation of copious amounts of sensor based data to initiate a given response conducive to the mission requirements demanded of the aircraft platform. The Lockheed-Martin C-130 aircraft has been used extensively to transport portable ground based C4I systems or to utilize dedicated airframe based C4I systems but have thus far excluded rapidly loaded aircraft based C4I portability which can engender a non-dedicated Lockheed-Martin C-130, Aerospatiale Transall C-160, Casa 212, Dehavilland Buffalo, or similar fixed or rotary wing, rear door palletized loading type airframe with advanced C4I capabilities in conjunction with non dedicated manned observation, telemetry, communications, data transmission and on board sensing and analysis capabilities.

Generally, a multiplicity of marine, and terrestrial based, components are needed to address a variety of different types of responses which can occur on any given mission. Existing military response methodology can and does include the use of several different fixed and rotary wing aircraft platforms with dedicated systems to address specific mission requirements which can include missile countermeasures, air to ground launched missiles, cannons, high speed Gatling guns, or other air to ground directional type weaponry typical of those weapon systems incorporated in the AC-130U Spectre Aerial Gunship produced by Lockheed-Martin Aeronautical Systems, and Rockwell International Corp.—North American Aircraft Modification Division of Anaheim, Calif., USA. However, current methodology fails to incorporate a single non-dedicated airframe response mix which can accommodate deployment of autonomous, or remote control terrestrial or marine vehicles and systems for the purposes or sensing/detection, toxic spill containment/remediation, personnel rescue, fire fighting, ship towing, surface based refueling/recharging and support.

There is a continuing unaddressed need for an aircraft based sensing, detection, targeting and response apparatus that is not airframe-specific, is modular in its design and components, thereby easily palletized for relatively quick and simple installation and removal from aircraft. The system should include a manned observation platform which protrudes into the airstream beyond the airframe periphery to enhance human observation ergonomics which can be rapidly mounted within minutes on any number of similar airframes. The communications systems should ideally be highly portable and capable of multi-frequency, ship, shore, man portable, submarine, aircraft, or satellite based civilian or military communications, telemetry, and data transmission capability. The system should have the capability of deploying a variety of rapidly loaded and deployed response capabilities which can be ejected from the aircraft immediately after receiving and analyzing sensor, or communications based locational data.

SUMMARY OF THE INVENTION

The foregoing problems with existing products and technology in the field of aircraft based sensing, detection, targeting and response systems have been overcome with the present invention. The system and apparatus of this invention provides for a rapidly loaded, palletized, non-dedicated fixed or rotary wing aircraft based, manned observation, sensor launch system, with self-powered sensing and targeting pod, multi-frequency antenna array, and with C4I analysis and control capabilities. The system may be used to deploy and manipulate autonomous and remote control vehicles, for the purpose of recovering and protecting persons in peril; containing/remediating toxic spills; sensing/detection; fire fighting; ship towing; or surface based refueling and support. Although not the primary purpose, this system can also be used for to support an offensive weapons system which could be used to selectively eliminate various targets with a standoff delivery capability.

The system and apparatus of the present invention is generally comprised of a removable pallet assembly adapted for loading into, and mounting to the floor of, the interior of the aircraft; a seating assembly moveably mounted to the pallet assembly; an integrated door assembly retractably mounted to the pallet assembly and adapted fit into an opening in the aircraft upon removal of the aircraft side door member, the integrated door assembly having a door frame member defining a periphery; at least one remote sensing pod retractably attached to the door frame adapted for deployment from the interior of the aircraft to the exterior of the aircraft; at least one radar member retractably attached to the door frame adapted for deployment from the interior of the aircraft to the exterior of the aircraft; at least one antenna array retractably attached to the door frame adapted for deployment from the interior of the aircraft to the exterior of the aircraft; and control means for coordinating the members and functions of the apparatus.

The aircraft used may be any fixed or rotary wing aircraft equipped with at least one side door and a rear cargo door adapted for pallet loading. The pallet assembly of the invention is an integrated assembly adapted for self-contained storage and deployment of the apparatus of the invention. These elements includes but is not limited to the observer seat assembly; the remote sensing pods; the radar members; the antenna arrays; as well as sonotube launch assemblies; radome members and their supporting members; and hydraulic power modules.

The radar of the present invention includes Downward Looking Airborne Radar (DLAR) and Side Looking Airborne Radar (SLAR). The antenna elements of the present invention include RF and satellite based antenna arrays. The invention further provides for a Command, Control, Communications, Computer and Intelligence (C4I) system for control of the apparatus of the present invention as well as communication to and control of external systems.

BRIEF DESCRIPTION OF THE DRAWINGS

Additional attributes of the current invention will become apparent to those skilled in the art to which the current invention relates from analyzing the following specifications with reference to the accompanying drawings, in which.

DETAILED DESCRIPTION OF THE INVENTION

Figure 1:
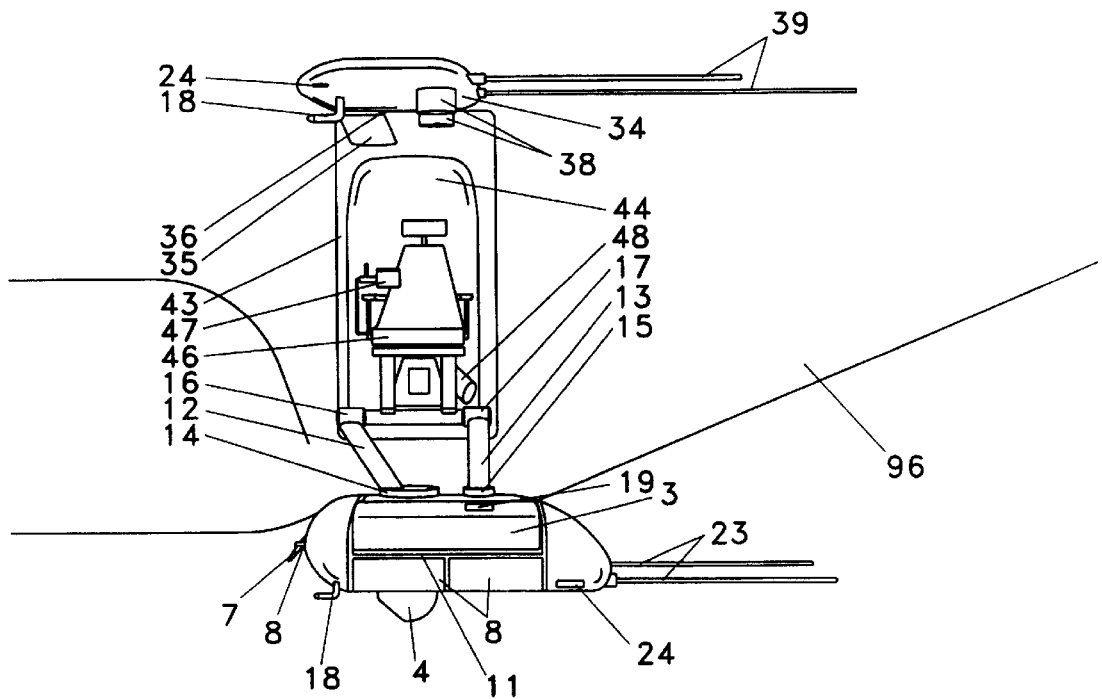
FIG. 1 is a left side profile view of a first large airborne sensor pod assembly with one orb and integrated Side Looking Airborne Radar (SLAR) antenna housing, integrated multi-frequency antenna assembly, and observer bubble door/seat assembly mounted on a Lockheed C-130 aircraft.

The invention is now described in terms of the FIGURES to more carefully delineate in more detail the scope, materials, conditions, and methods of the present invention.

FIGS. 1, 2, 3, 5, 6, 7, 9, 10, 12, 13, 14, and 15 show the overall external configuration of the first airborne remote sensor pod assembly 1.0, with at least one multi frequency RF and satellite based antenna array 3.0, and integrated door assembly 4.0, mounted on a Lockheed C-130 aircraft in accordance with the present invention.

The preferred embodiment of the current invention incorporates a palletized, rapidly loaded, air deployed and retracted, airborne remote sensor pod assembly 1.0 for the purpose of gathering various types of sensor data to effect precise deployment and positioning of an armed, or benevolent, airborne response, or to undertake for commercial, scientific, military or other reason, airborne terrestrial, marine, or air based sensing and cartographic activities of an electronic nature within hostile or benign mission theaters through the use of a thermal-infra red imaging sensor means, synthetic aperture radar sensor means, side looking airborne radar (SLAR) imaging sensor means, downward looking airborne radar (DLAR) sensor means, laser imaging sensor means, standard video sensor means, enhanced night video sensor means, laser/radar ranging sensor means, or gas chromatographic, biological, or other sensor detection means, or communications and electronics payload means. The various sensors are housed within a sensor pod primary housing 1 to provide an aerodynamically engineered casing which will protect the sensors from environmental damage and minimize parasitic drag while maximizing internal space of the casing to permit the optimum volume possible for sensor loading through the rear side door of a C-130 aircraft 96 platform or an alternative sensor pod secondary housing 2 which achieves a similar function as that described in the sensor pod primary housing 1 but has reduced volume to accommodate simultaneous tandem deployment on the opposite side of the aircraft, in conjunction with the sensor pod primary housing 1 and incorporates a mounting surface for an optional sensor pod primary housing with SLAR antenna 3, shown in FIG. 3, mounted on the outward face away from the aircraft to which the sensor pod primary housing 1 is mounted.

Figure 6:
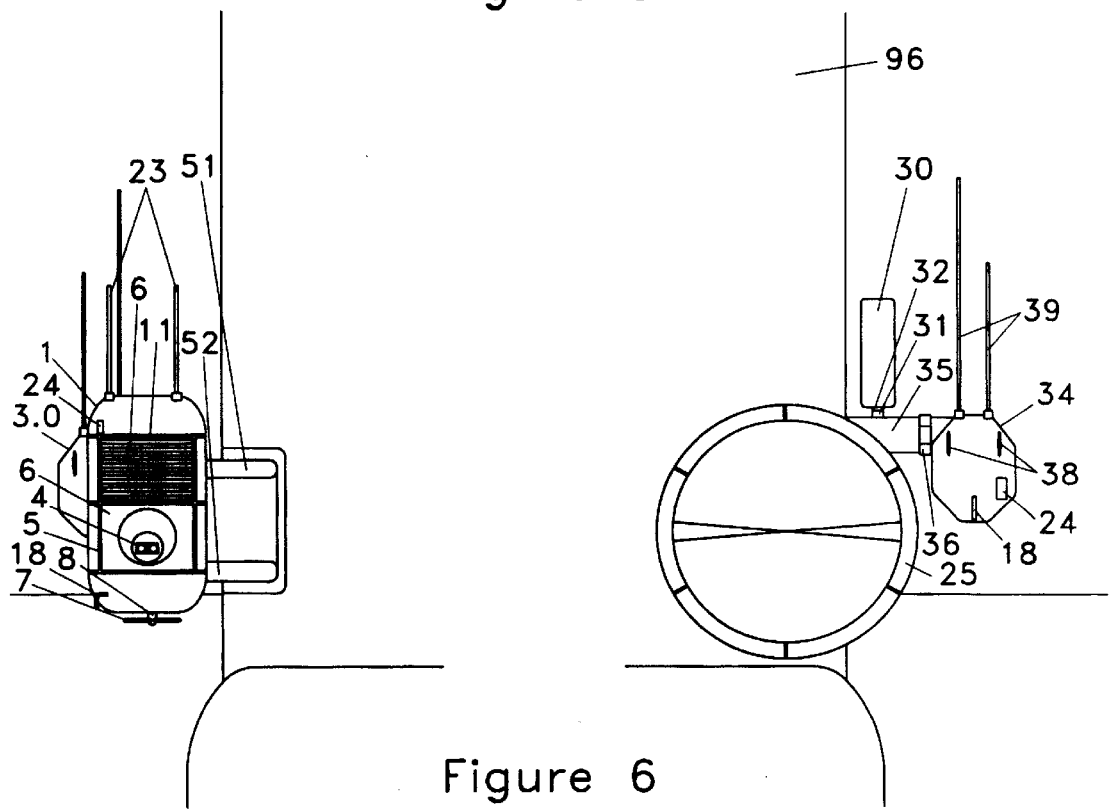
FIG. 6 is a view looking up to a first Downward Looking Airborne Radar (DLAR) assembly, integrated multi-frequency antenna assembly, modified observer bubble door/seat assembly with missile countermeasures means and pivoting SLAR antenna, with a first large airborne sensor pod assembly, with two orbs, Ram Air Turbine (RAT), and integrated SLAR antenna housing, integrated multi-frequency antenna assembly, and observer bubble door/seat assembly mounted on a Lockheed C-130 aircraft.

FIGS. 1 and 6 show a sensor pod sensor mounting frame 11 which provides a structural reinforced mounting surface for the installation of various sensor pod tracking orbs 4 or other sensor hardware, within a larger rapid access sensor pod main sensor sectional panel 5, shown in FIG. 6, which is further divided into two smaller rapid access sensor pod secondary sensor panels 6 for the purpose of undertaking remote sensing, targeting, and tracking activities which require varying degrees of power. Power is supplied by an aerodynamically engineered sensor pod RAM air turbine (RAT) 7, which has an optimized propeller design for the given average cruise speed of the aircraft platform to which it is mounted, in order to provide the maximum possible mechanically generated wind power to a sensor pod RAT alternator/generator 8, which in turn provides requisite power to all the various palletized sensor, C4I, and robotic systems.

Figure 2:
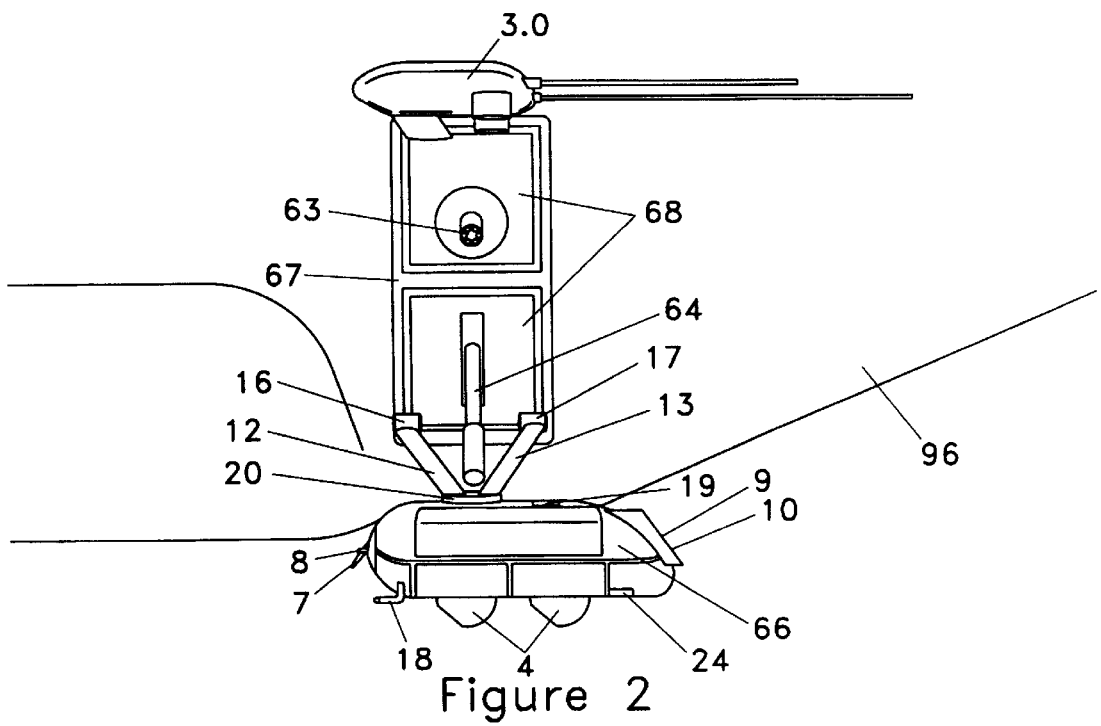
FIG. 2 is a left side profile view of a large military variant of a first airborne sensor pod assembly, with two orbs and integrated SLAR antenna housing with missile countermeasures means, integrated multi-frequency antenna assembly, and weapons assembly means mounted on a Lockheed C-130 aircraft.
Figure 9:
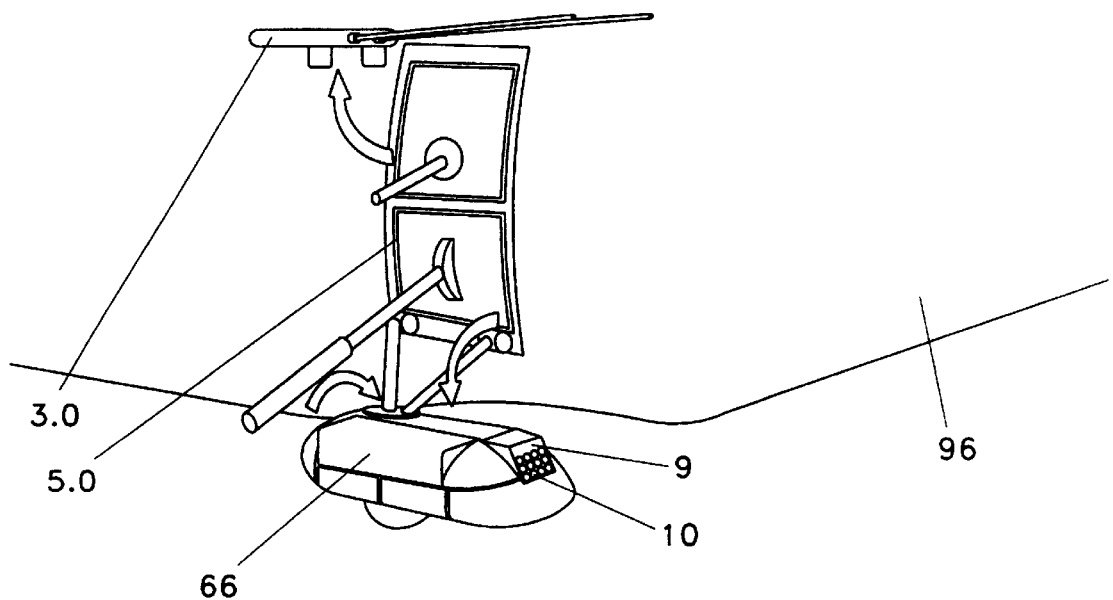
FIG. 9 is a 3 dimensional left side rear perspective view of a first large military airborne sensor pod assembly means, with two orbs, integrated SLAR antenna housing with missile countermeasures means, integrated multi-frequency antenna assembly, and weapons assembly means mounted on a Lockheed C-130 aircraft, depicting robotic motion paths of deployment actuation means.

As shown in FIGS. 2 and 9, the sensor pod primary housing 1 also has provision to accommodate the mounting of various sensor pod missile detection system 9 means typical of the AN/AAR-47 missile warning system manufactured by Loral of the USA, and various sensor pod missile countermeasures means 10 typical of radar chaff and hot flare decoy dispenser systems designated AN/ALE-40 or AN/ALE-47 as manufactured by Tracor of Austin, Tex., USA, or a Sanders AN/ALQ-157 infrared countermeasures system, or Sanders Advanced Threat Infrared Countermeasures System (ATICS) which utilizes tracking orbs or other systems of current design and utilization to provide protection for the aircraft platform when undertaking sensing, targeting, and response activities in hostile combative environments.

Figure 3:
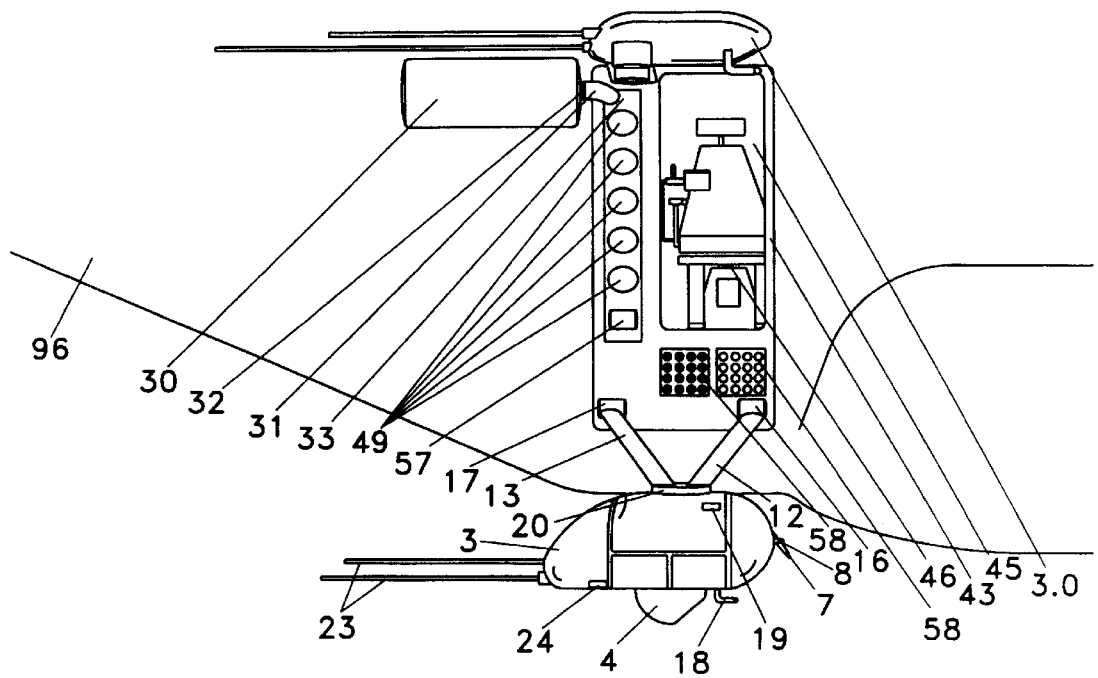
FIG. 3 is a right side profile view of a first small airborne sensor pod assembly, with one orb, integrated multi-frequency antenna assembly, modified observer bubble door/seat assembly with missile countermeasures means and pivoting SLAR antenna, mounted on a Lockheed C-130 aircraft.

As shown in FIGS. 1–3, the sensor pod primary housing 1 further provides a structurally reinforced mounting surface and aerodynamically engineered strut fairing sensor pod forward primary strut joint 14 (FIG. 1), to attach a sensor pod forward mounting strut 12 and further provides for mounting a telescopic sensor pod rear mounting strut 13 and sensor pod rear primary strut joint and track assembly 15 (FIG. 1).

Figure 7:
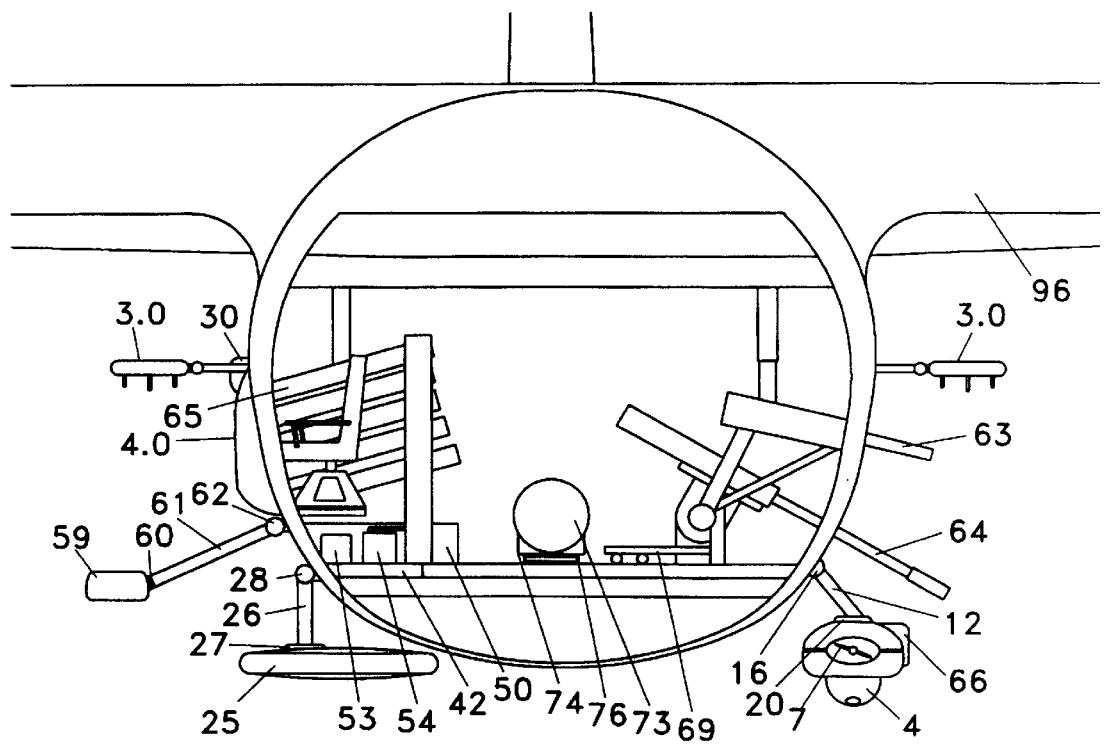
FIG. 7 is a frontal cross-sectional view of a first Downward Looking Airborne Radar (DLAR) assembly means, integrated multi-frequency antenna assembly, modified observer bubble door/seat assembly with missile countermeasures outrigger means, and pivoting SLAR antenna means, and a first large military combative airborne sensor pod assembly means, with two orbs, integrated SLAR antenna housing with missile countermeasures means, integrated multi frequency antenna assembly means, a 40 mm cannon and a 25 mm automatic Gatling gun weapons means, door frame mounting with interchangeable door plates means, mounted on a Lockheed C-130 aircraft.
Figure 8:
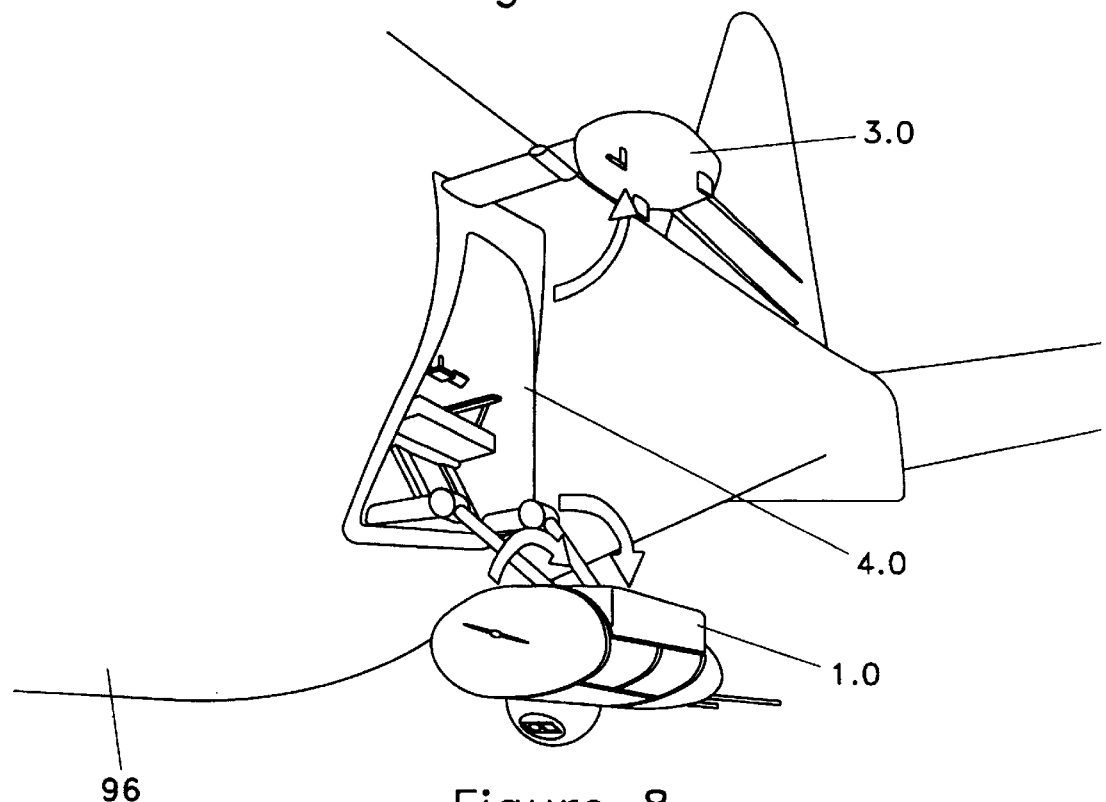
FIG. 8 is a left side front perspective view looking up, of a first large airborne sensor pod assembly means, with one orb, integrated SLAR antenna housing means, integrated multi-frequency antenna assembly, and observer bubble door/seat assembly mounted on a Lockheed C-130 aircraft, depicting robotic motion paths of deployment actuation means.
Figure 14:
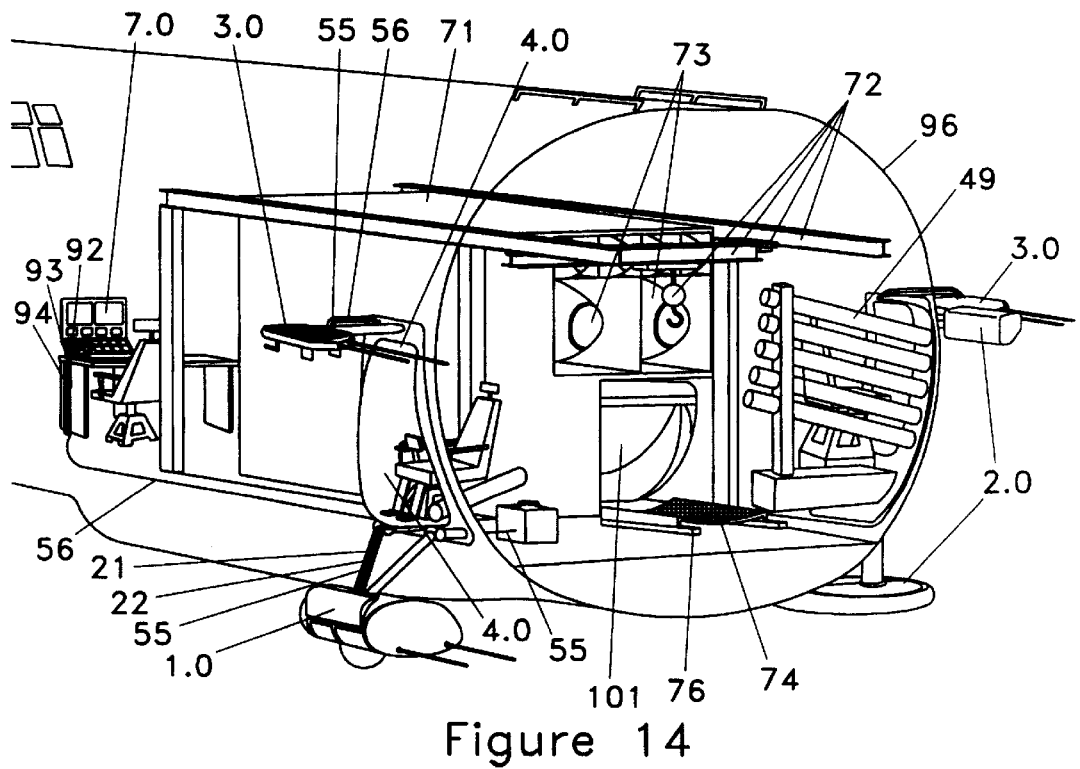
FIG. 14 is a rear perspective view through the aircraft fuselage of the robotic Vehicle Handling and Deployment System 6.0 means, with an AMV apparatus ADC container system mounted on an IMADS cradle deployment system with extraction and recovery deployment chute means, a C4I console system means, Airborne Remote sensor pod assembly 1.0 means, RF and Satellite Based antenna array 3.0 means, DLAR and SLAR antenna Assemblies 2.0 means, integrated door assembly 4.0 means, and C4I assembly 7.0 and observer bubble door/seat assembly mounted on a Lockheed-Martin C-130, Aerospatiale Transall C-160, Casa 212, Dehavilland Buffalo, or similar fixed or rotary wing, rear door palletized loading type aircraft.
Figure 15:
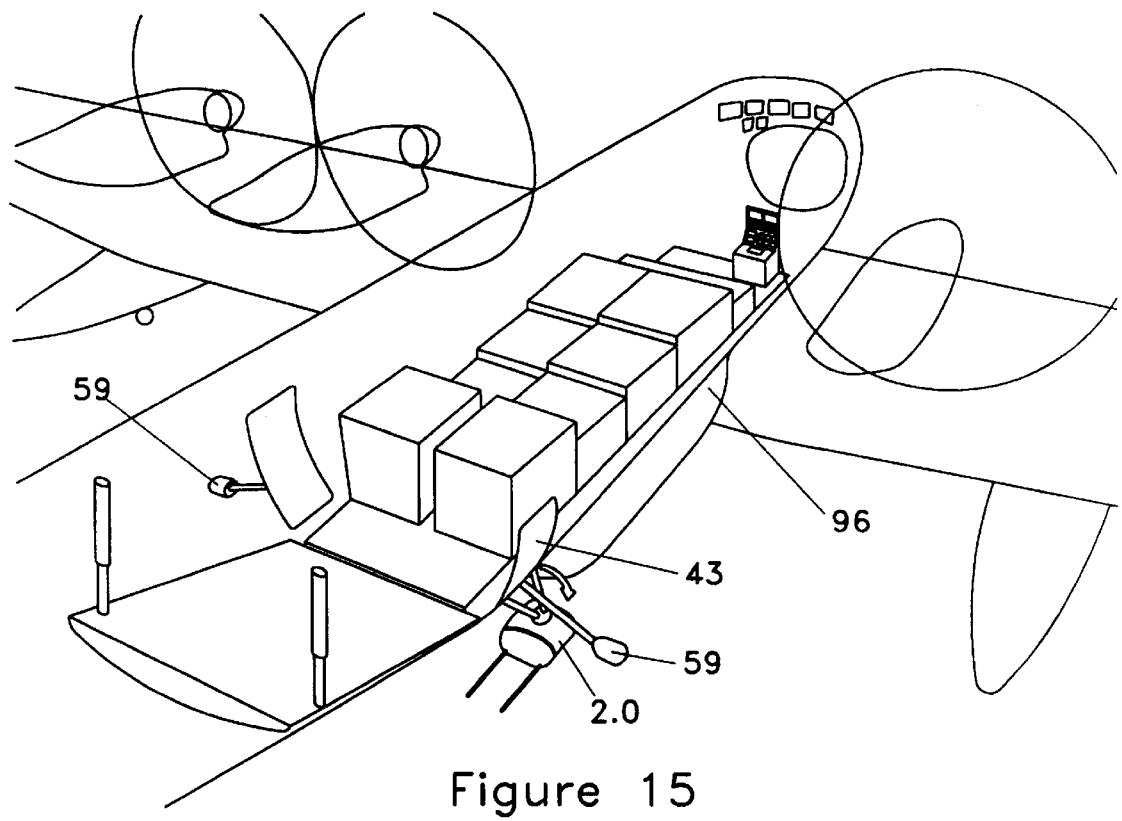
FIG. 15 is a translucent perspective view of a detachable door means, removed from loading pallet means, equipped with lightweight sensor pod equipped with integrated sensor pod antennas, equipped with alternative missile detection and counter measures means fastened to a retractable outrigger means, depicting robotic motion path of the missile detection and counter measures outrigger deployment actuation means, and lightweight small sensor pod, a C4I Console pallet means, mounted on a Lockheed C-130 aircraft with cargo pallets.

The preferred embodiment of the present invention also incorporates a rotational sensor pod forward secondary strut joint and a rotational sensor pod rear secondary strut joint which are attached through the integrated door frame 43 to the integrated door pallet 42 (FIG. 7) by means of a standardized robotic interface, incorporated within the forward mounted door sensor pod and DLAR radome robotic armature No. 1 51 shown in FIG. 6, and an aft mounted door sensor pod and DLAR radome robotic armature No. 2 52 which are connected by means of armored electromagnetic interference (EMI) shielded electrical sensor pod and antenna array power and hydraulic cable and hose 55, shown in FIG. 14 to an integrated door hydraulic robotics and electric power module 53, shown in FIG. 7. The radome robotic armatures are further connected to a secondary backup, hand pumped, integrated door hydraulic robotics manual power module 54, shown in FIG. 7, which provides for extension, retraction, and rotational capabilities of the sensor pod, and other appendages, and further provides for a standard structural mounting interface to support various detection, sensor, and communications hardware which are deployed into or retracted from the air stream around the C-130 Aircraft 96 platform through the side doors of the aircraft.

As shown in FIGS. 1–3, the preferred embodiment of the current invention also accommodates the mounting of a sensor pod Pitot tube 18 to gain a stand alone assessment of aircraft speed, a sensor pod GPS antenna 19 and sensor pod GPS card 20 of existing design to gain a stand alone fix on the aircraft platform's geographic position, a sensor pod altimeter 24 to determine stand alone aircraft altitude, and a pair of sensor pod retractable auxiliary RF antennas 23. These elements may be mounted in various locations within and on the surface of the sensor pod primary housing 1, and are further connected to the C4I assembly 7.0 by means of a pair of redundant, armored sensor pod data relay cables 22 housed within the sensor pod forward mounting strut 12, shown in FIG. 14, to provide data to and from said sensing devices, and said sensor pod locational data devices, and further incorporates a pair of redundant, armored sensor pod Electrical power relay cables 21 housed within the sensor pod Forward Mounting Strut 12, shown in FIG. 14, which provide power to all other systems from the sensor pod RAT 7. Of course, these elements can receive electrical power routed to the sensor pod systems from, for example, the C4I assembly 7.0 from other battery, aircraft engine, or other auxiliary power means in the event that said RAT is unserviceable.

The preferred embodiment of the present invention also incorporates a portable multi-frequency communications and data telemetry system with a flexible RF and satellite based antenna array 3.0 mounted on opposing sides of the aircraft platform. These elements, shown primarily in FIGS. 1–4, and 7–11 may have the capability to transmit and receive over a variety of frequencies throughout the LF, HF, MF, VHF and UHF frequencies with satellite relay capabilities through MILSAT, INMARSAT, ORBCOM, or pending Motorola IRIDIUM and M-STAR satellite systems. They may have the further ability to transmit manned or unmanned vehicle based audio, video, or data telemetry to land, sea or airborne platforms comprised of an aerodynamically engineered communications and telemetry antenna array housing 34 that provides an enclosure and structural frame to mount a communications and telemetry antenna array strut 35, shown in FIGS. 5 and 6, which is further fastened to a communications and telemetry antenna array primary joint 36, shown in FIGS. 5 and 6, which is used to swing the antenna array housing 34, in an upward direction into a locked horizontal position. The communications and telemetry antenna array housing 34 further provides for an internal communications and telemetry antenna internal support frame 37, shown in FIG. 5, to provide a mounting means for communications and telemetry antenna array airfoil antennas 38, and for two or more communications and telemetry antenna array retractable whips 39, and at least one flat patch communications and telemetry antenna array SATCOM antenna 40, with a self contained GPS and communications and telemetry antenna array GPS antenna 41, shown in FIG. 5.

The preferred embodiment of the present invention also incorporates a portable, pallet mounted, air deployed integrated door assembly 4.0 comprised of an integrated door frame 43 assembly means, mounted to an integrated door pallet 42 typical of the U.S. Air Force type III, IV, and V, pallets manufactured by SouthTek International of Florida, USA. The door assembly further comprises an integrated door frame primary observation bubble 44, shown in FIGS. 1 and 8, and integrated door frame secondary observation bubble 45, shown in FIGS. 3 and 10. For both the primary and secondary observation bubbles, the door assembly incorporates an integrated door observer seat assembly 46 with an arm rest mounted integrated door observer seat operator control console 47 means to effect direct visual control of air deployed response vehicles, with an integrated door Sonotube primary launch assembly means 48, positioned on the lower downwind side of the seat for ejecting type "A", "B", or "C" size Sonotube sensor packages, or utilizing a modified multiple type "A", "B", or "C" size Sonotube launch capability incorporated within an integrated door Sonotube secondary launch assembly means 49, shown in FIG. 3, with an adjacent integrated door Sonotube/flare/marker storage rack means 50, shown in FIG. 7.

The Sonotube launch assembly and storage rack means are attached to an integrated door pallet means 42, with a further attachment through the integrated door frame 43 to the door sensor pod and DLAR radome robotic armature No. 1 51, and further attached to door sensor pod and DLAR radome robotic armature No. 2 52. Power is provided by an integrated door hydraulic robotics electric power module 53, or in the event of failure of the primary system, by an integrated door hydraulic robotics manual power module means 54 with further connections to the remote sensing pod 1.0 assembly through a sensor pod and antenna array power and hydraulic cable and hose means 55, and various sensor pod and antenna array data relay cables 56, with optional integrated door mounted missile detection system means 57, and integrated door mounted missile countermeasures means 58 As shown in FIG. 7, the detection and countermeasures means may optionally be mounted on an integrated door outrigger missile detection/MCM system means 59, comprised of an integrated door missile detection system outrigger strut means 60, fastened to an integrated door outrigger strut primary joint assembly means 61. This configuration facilitates raising and lowering the integrated door outrigger missile detection system 59, and a further integrated door outrigger strut secondary joint assembly 62 to adjust the assembly for optimum detection and countermeasures deployment once the outrigger assembly is down and locked.

Figure 11:
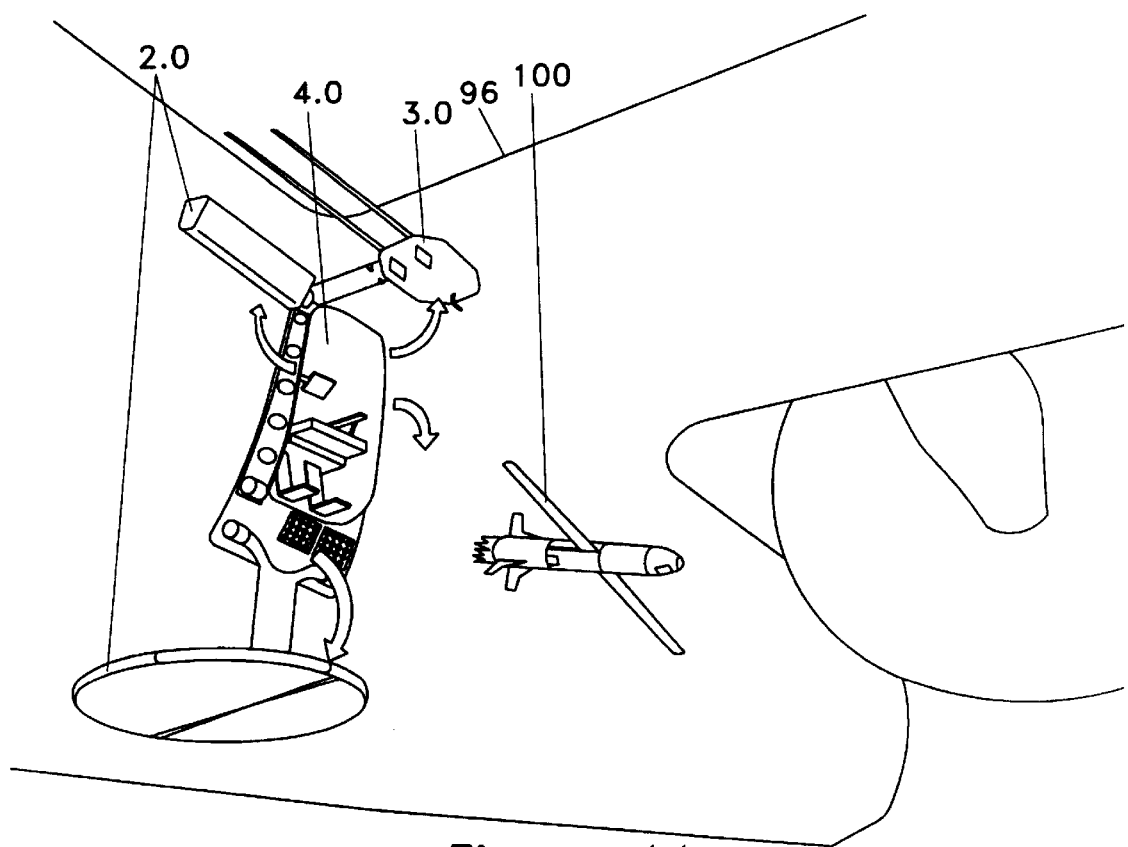
FIG. 11 is a right side perspective view looking up, of a first Downward Looking Airborne Radar (DLAR) assembly means, integrated multi-frequency antenna assembly, modified observer bubble door/seat assembly with Missile countermeasures means and pivoting SLAR antenna means, depicting a type "A" Sonotube missile Sonotube reconnaissance drone and/or conversely combative missile variant launch means from multiple Sonotube ejection means, mounted on a Lockheed C-130 aircraft, depicting robotic motion paths of deployment actuation means.
Figure 12A:
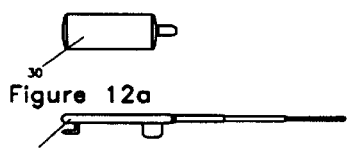
FIG. 12 is a profile view of representative interchangeable components of the present system apparatus.
Figure 12B:
Figure 12C:
Figure 12D:
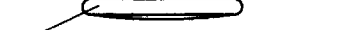
Figure 12E:
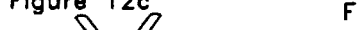
Figure 12F:
Figure 12G:
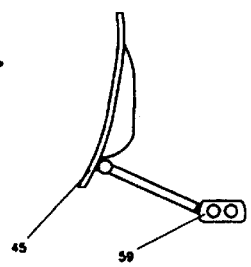
Figure 12H:
Figure 12I:
Figure 12J:
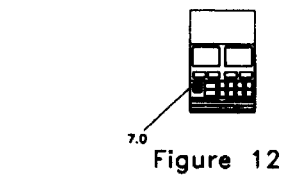
Figure 12K:
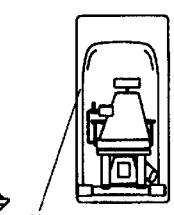
Figure 12L:
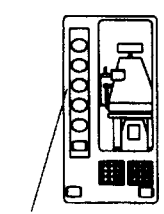
Figure 12M:
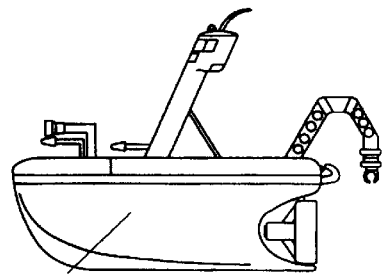
Figure 13A:
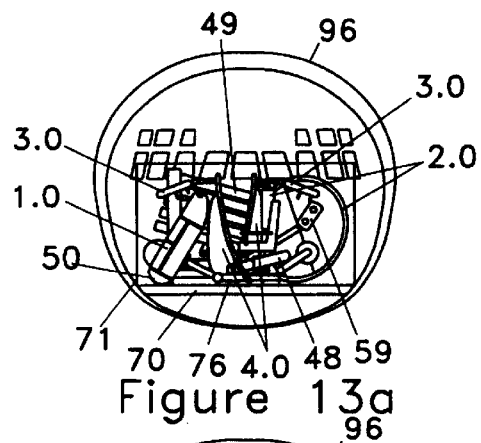
FIGS. 13A–13D are section views depicting four representative configurations of the current apparatus in various stages of the deployment sequence.
Figure 13C:
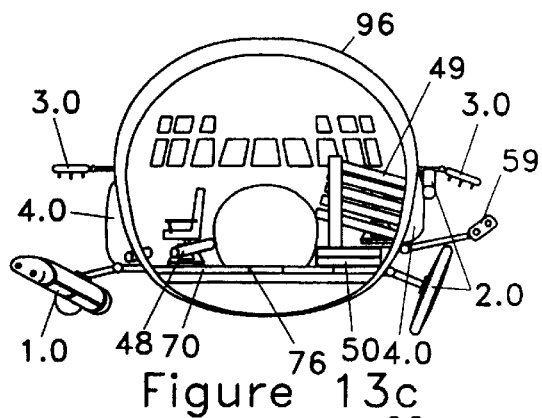
Figure 13B:
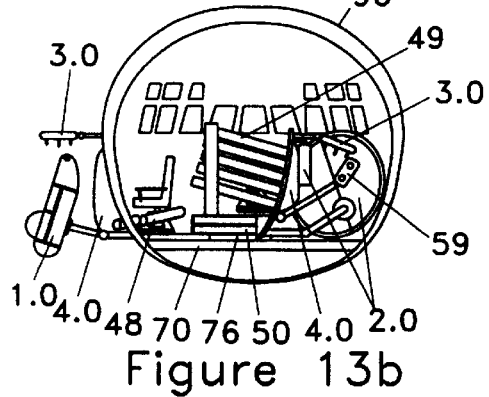
Figure 13D:
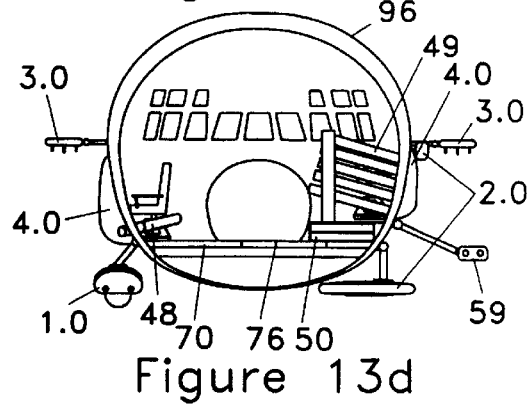

FIG. 11 shows the overall external configuration of the first DLAR and SLAR antenna Assemblies 2.0, with a pair of multi frequency RF and satellite based antenna array means 3.0, and integrated door assembly 4.0, mounted on a Lockheed C-130 aircraft in accordance with the present invention.

Figure 4:
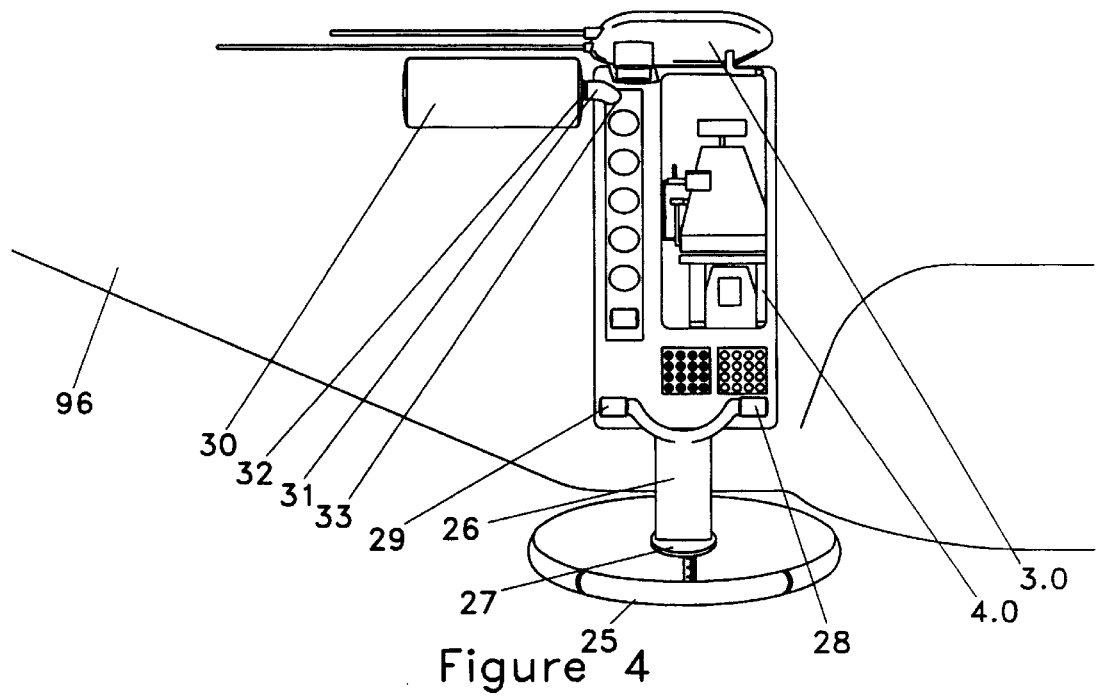
FIG. 4 is a right side profile view of a first Downward Looking Airborne Radar (DLAR) assembly, integrated multi-frequency antenna assembly, modified observer bubble door/seat assembly with missile countermeasures means and pivoting SLAR antenna, mounted on a Lockheed C-130 aircraft.
Figure 5:
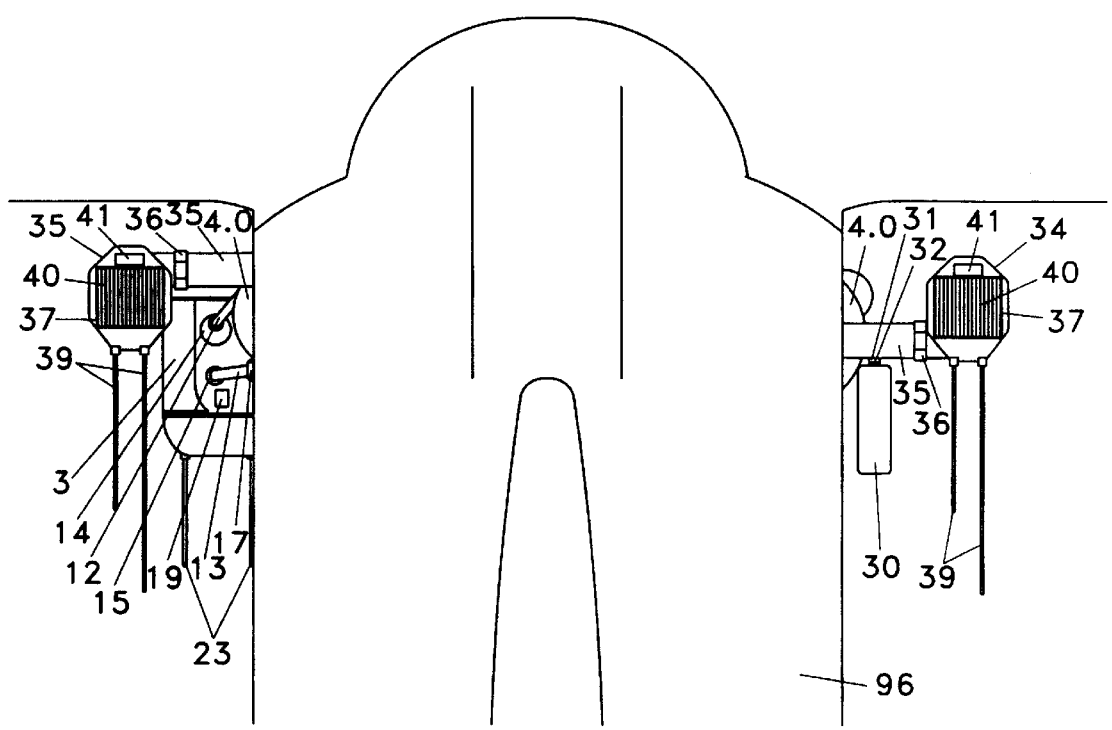
FIG. 5 is a plan view looking down of a first Downward Looking Airborne Radar (DLAR) assembly, integrated multi-frequency antenna assembly, modified observer bubble door/seat assembly with missile countermeasures means and pivoting SLAR antenna, with a first large airborne sensor pod assembly means, with 2 orbs, RAT, and integrated SLAR antenna housing, integrated multi-frequency antenna assembly, and observer bubble door/seat assembly mounted on a Lockheed C-130 aircraft.

The preferred embodiment of the present invention also accommodates the rapid loading, airborne deployment and retraction of various configurations of DLAR and SLAR antenna assemblies 2.0 for the purpose of gathering various types of radar based data to be analyzed for previously said military and civilian purposes. As shown in FIGS. 4 and 7, the preferred embodiment of these elements comprises an aerodynamically engineered, horizontally segmented, rotating DLAR Radome antenna housing 25 to provide an efficient flight envelope with either rotating or stationary radar antenna typical of those manufactured by Randtron and Lockheed-Sanders, or stationary large surface area phased array Interferometric Synthetic Aperture Radar For Terrain Elevation (IFSARE) typical of the high resolution system developed by the Environmental Research Institute of Michigan, USA.

The DLAR and SLAR deployment and retraction configuration further provides for a structural mounting surface for a DLAR radome antenna main strut assembly means 26 which is connected mechanically and electrically to a rotational motor actuator assembly and mounting frame means 27. It is further connected with a rotational DLAR radome antenna main strut joint assembly means 28 integrating a mechanical fastening device with robotic actuator which is further attached at the opposite end of the DLAR Radome antenna main strut assembly means 26 to a DLAR radome antenna main strut secondary joint assembly means 29. Control is facilitated by integrating a mechanical fastening device with robotic actuators which are attached through the integrated door frame 43 to the integrated door pallet 42 by means of a standardized robotic interface, incorporated within the forward mounted door sensor pod and DLAR radome robotic armature No. 1 51 and an aft mounted door sensor pod0 and DLAR radome robotic armature No. 2 52. These elements are electro-mechanically connected by means of armored EMI shielded electrical sensor pod and antenna array power and hydraulic cable and hose 55 to an integrated door hydraulic, Robotics, and Electric power Module 53 means and are further connected to a secondary backup, hand pumped, integrated door hydraulic, robotics, manual power module 54 means which provides for extension, retraction, and rotational capabilities of the DLAR radome antenna housing 25 and other appendages, and further provides for a standard structural mounting interface to support various detection, sensor, and communications hardware which are deployed into or retracted from the air stream around the C-130 Aircraft 96 through the side doors of the aircraft.

Figure 10:
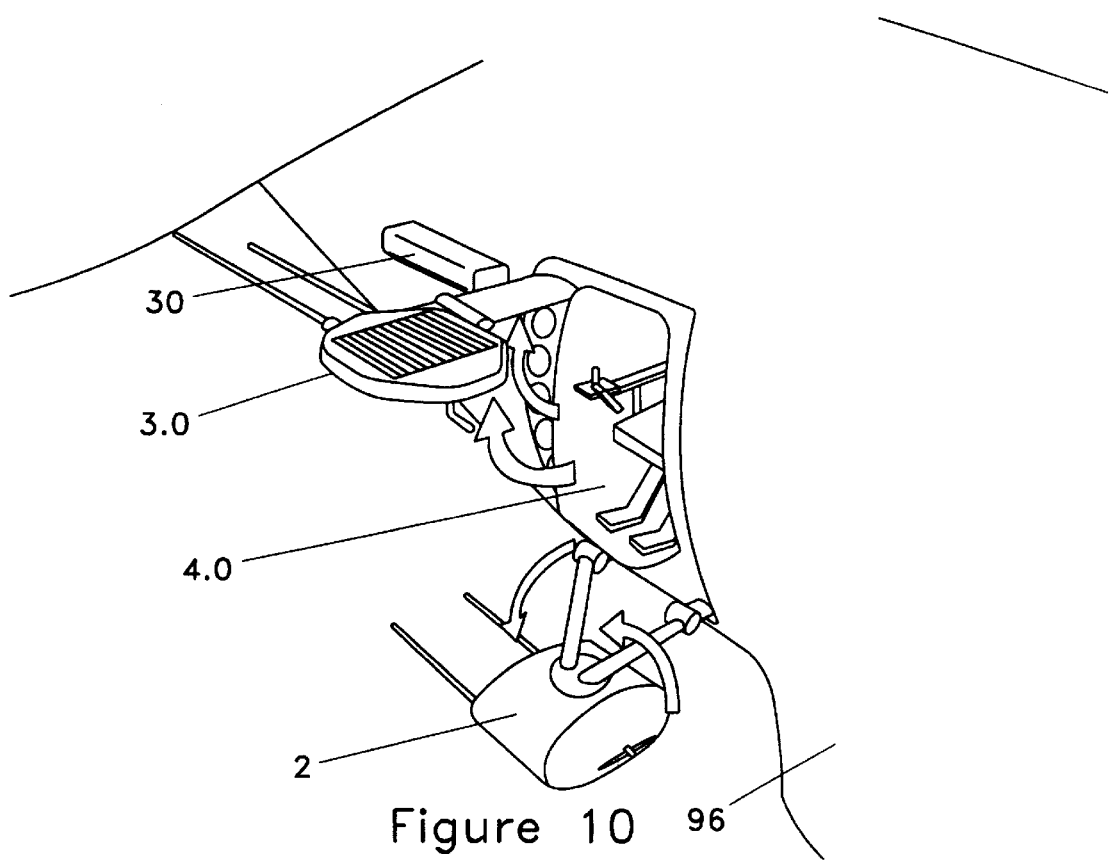
FIG. 10 is a right side perspective view of a first small airborne sensor pod assembly, with one orb, integrated multi-frequency antenna assembly, modified observer bubble door/seat assembly with Missile countermeasures means and pivoting SLAR antenna means, mounted on a Lockheed C-130 aircraft, depicting robotic motion paths of deployment actuation means.

The preferred embodiment of the present invention also accommodates the option of deploying a SLAR antenna housing 30, as shown in FIGS. 3, 7 and 10. This antenna allows taking radar scans inherently typical of the HISARS Tier Two Plus synthetic aperture radar system manufactured by Hughes Electronics, USA, or like the Racal Radar Defense, USA, integrated stationary Moving Target Indicator (MTI) and Synthetic Aperture Radar antenna array. The antenna configurations provides for a structural mounting surface for a SLAR antenna main strut 31, shown in FIG. 5, with SLAR antenna main strut primary joint 32, also shown in FIG. 5, integrating a mechanical fastening device with robotic actuator which is further attached at the opposite end of the SLAR antenna main strut 31 to a SLAR antenna main strut secondary joint 33, shown in FIGS. 3 and 4. An integrated mechanical fastening device with robotic actuator is attached through the integrated door frame 43 to the integrated door pallet 42 by means of a standardized robotic interface, incorporated within the forward mounted door sensor pod and DLAR radome robotic armature No. 1 51 and an aft mounted door sensor pod and DLAR radome robotic armature No. 2 52 which are connected by means of armored EMI shielded electrical sensor pod and antenna array power and hydraulic cable and hose 55 means to an integrated door hydraulic, robotics, and electric power module 53. These elements are further connected to a secondary backup, hand pumped, integrated door hydraulic, robotics, manual power module 54 which provides for extension, retraction, and rotational capabilities of the SLAR antenna housing 30 and other appendages, and further provides for a standard structural mounting interface to support various detection, sensor, and communications hardware which are deployed into or retracted from the air stream around the C-130 aircraft 96 platform, through the side doors of said C-130 aircraft.

FIGS. 2, 7, 9, 11, 13, and 20, show the overall external configuration of a first portable integrated weapons door assembly 5.0, with a pair of multi-frequency RF and satellite based antenna array means 3.0, and remote sensing pod means 1.0, mounted on a Lockheed C-130 aircraft in accordance with the present invention.

One embodiment of the present invention also accommodates the rapid loading, airborne deployment and retraction of various configurations of an integrated weapons door assembly 5.0 for the purpose of gathering various types of radar and sensor based data to be analyzed for the sole purpose of detecting, targeting and destroying hostile entities which may pose a threat to the aircraft platform, or may form part of an offensive military exercise. The integrated weapons may comprise a General Electric GAU-12U, six barrel 25 mm Gatling Gun assembly 63, mounted within the upper door frame subsection panels 68, with a Bofors 40 MM Armor Piercing Cannon assembly 64, mounted within the lower door frame subsection panels 68, mounted within a reinforced main sectional door frame 67, all of which are in turn fastened to a weapons carriage assembly means 69.

The present invention also allows for interchangeable section configurations which would permit the launch of a Rockwell International air-to-surface "Hellfire" missile from a dedicated launch system mounted on the weapons carriage assembly means 69, or the "Sea Spike" Type "A" Sonotube Reconnaissance drone/missile from the modified door Type "A" Sonotube ASM missile Launch assembly 65, as shown in FIG. 11. The integrated weapons system may be moved into position in one lateral motion to the aircraft longitudinal axis, using the forward mounted door sensor pod and DLAR radome robotic armature No. 1 51, and an aft mounted door sensor pod and DLAR radome robotic armature No. 2 52, powered by an integrated door hydraulic, robotics, and electric power module 53. The integrated weapons system may be further connected to a secondary backup, hand pumped, integrated door hydraulic, robotics, manual power module 54 which provides for extension and retraction capabilities of the weapons carriage system. Detection, targeting and tracking of targets for the purposes of fire control is obtained though utilization of the modified sensor pod with missile detection/counter-measures assembly 66 which is then relayed by means of the data cable relay means to the C4I assembly 7.0 for analysis, identification, target prioritization, tracking, and weapons tasking. The weapons system may further incorporate the utilization of a missile detection and countermeasures system mounted within the modified door Type "A" Sonotube ASM missile launch assembly 65 to provide warning and protection of missile threats to the non-dedicated C-130 aircraft 96.

FIG. 14 shows the overall internal configuration of a first portable airborne remote sensor pod assembly 1.0, DLAR and SLAR antenna assemblies 2.0, with a pair of multi-frequency RF and satellite based antenna array means 3.0, and integrated door assembly means 4.0, with vehicle handling and deployment system means 6.0, and C4I assembly means 7.0 as it would appear loaded into the cargo space of a Lockheed C-130 aircraft, in accordance with the present invention.

One embodiment of the current invention incorporates a palletized, rapidly loaded, robotic vehicle handling and deployment system 6.0, for the purpose of selecting and deploying various autonomous and remote control vehicle response packages which are ejected from the aircraft to undertake various missions controlled and tasked by the deploying aircraft. One such autonomous and remote control vehicle and system is disclosed in pending U.S. application Ser. No. 08/544,460 of Richard L. K. Woodland, filed Oct. 18, 1996 and hereby incorporated by reference. As shown in FIGS. 13 and 14, the robotic vehicle handling and deployment system 6.0 comprises a vehicle storage pallet assembly 70 means to provide a support platform for the various vehicles and robotics handling systems, a vehicle and equipment storage container assembly 71 to house the various items of specialized equipment, ordinance, air deployed vehicles or other materials, a vehicle handling robotics assembly 72 to load and remove autonomous or remote control vehicles from the container for the purposes of air deployment, an Air Deployment Casing (ADC) assembly 73 for inflatable air deployed autonomous rescue vehicles and specialized operations inflatable boats, an Air Deployment Cradle assembly 74 to eject the vehicles, ADC's, or other packages from the aircraft through the rear cargo door, an Air Deployment Parachute assembly 75 to provide an extraction and recovery descent parachute canopy, and Air Deployment Cradle Rail assembly 76 to facilitate rapid installation and removal.

FIGS. 14, 15, 16, 17, and 18, show the overall external configuration of a first portable land, air, and sea Command, Control, Communications, Computer and intelligence (C4I) assembly 7.0, as it would appear when used aboard a Lockheed C-130 aircraft, in accordance with the preferred embodiment of the present invention.

Figure 16:
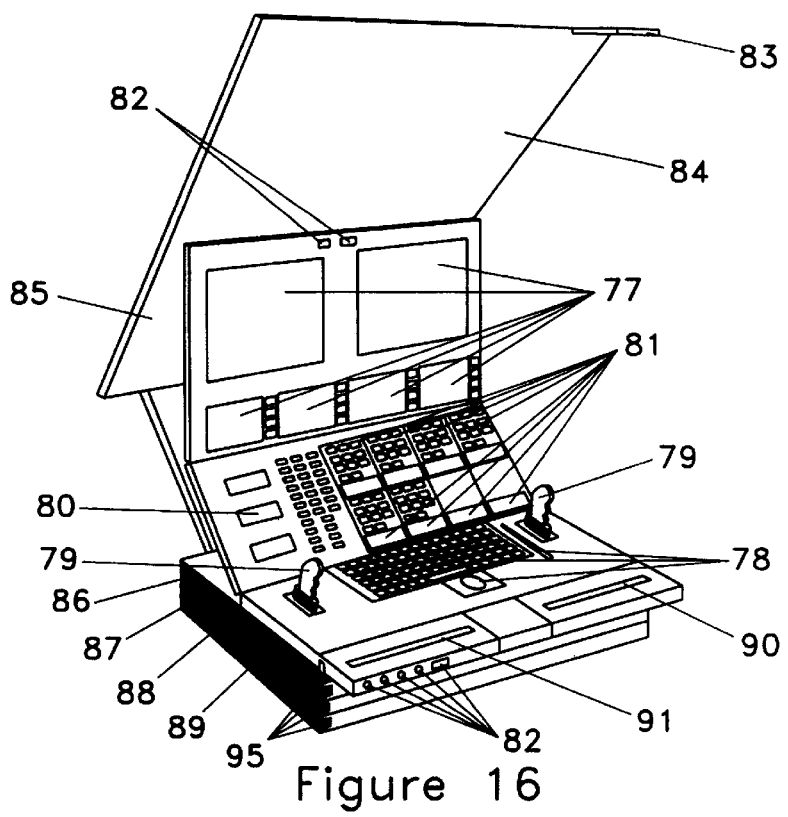
FIG. 16 is a front perspective view of a C4I console means fully extended with antenna relay cables deployed in an aircraft based operational scenario.
Figure 17:
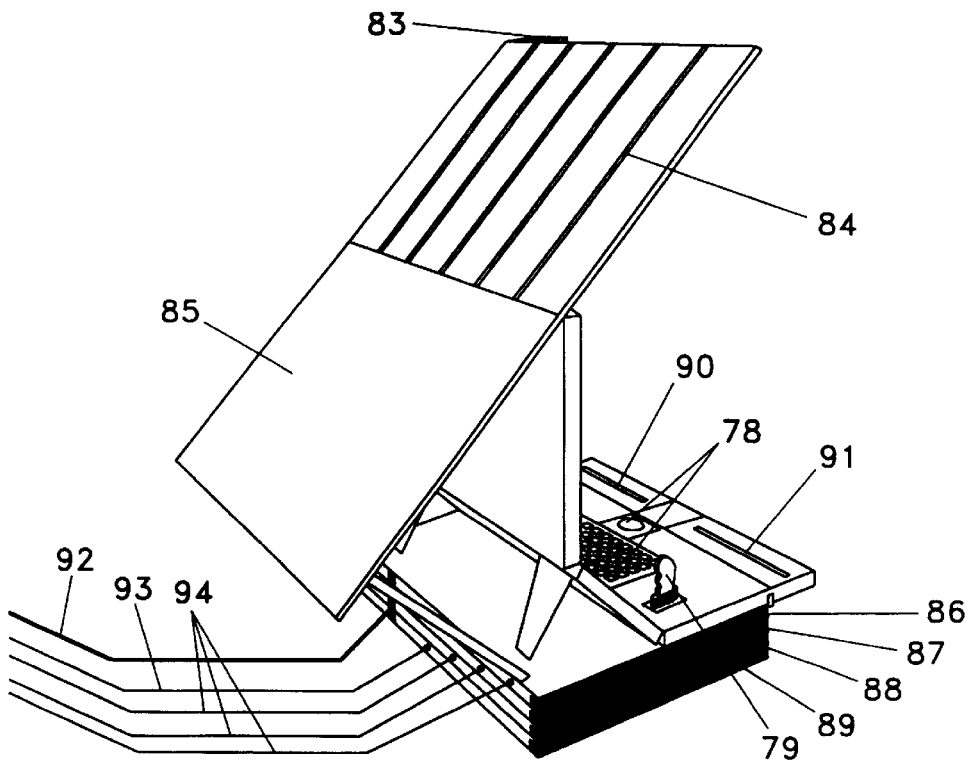
FIG. 17 is a rear perspective view of a C4I console means fully extended with antennas deployed as it would appear in a ground based type operational scenario.
Figure 18:
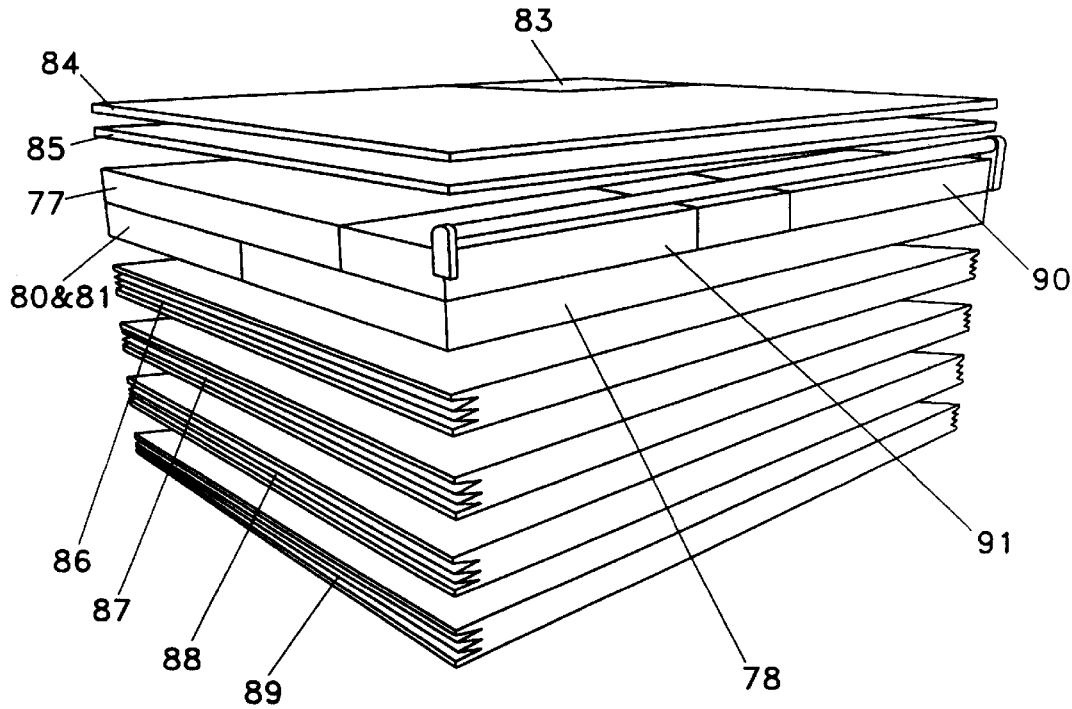
FIG. 18 is a frontal perspective view of a folded C4I console separated into its respective mission cases.

The preferred embodiment of the current invention incorporates a palletized, rapidly loaded, C4I assembly 7.0, for the purpose of processing sensor data, controlling said sensor pod means, controlling the DLAR/SLAR antennas, controlling the communications means, directing/targeting and controlling the weapons system, controlling the autonomous/remote control vehicle systems, and the internal aircraft robotic vehicle handling systems. As shown in FIGS. 16–18, the C4I assembly comprises a ruggedized/waterproof console casing assembly 95 to provide a waterproof, shock and vibration ruggedized, EMI shielded housing with conductive cooling means for the internal electronics and display systems. A mounting surface may accommodate a computer operator display interface assembly 77 to provide multiple ruggedized, waterproof, high resolution, active matrix color, stylus interactive, flat panel graphics displays typical of those manufactured by Sharp Electronics, Japan, to view simultaneous real-time video, data, or other information.

Telemetry and other data may be transmitted or processed through several different operating systems, including Unix, Windows, Windows NT, Dos or other hybrid operating systems for specific application programs or hardware means. Also provided is a control mounting surface to accommodate a ruggedized and waterproof backlit, operator trackball, keyboard, stylus manual interface assembly 78 to physically allow the C4I system operator to interface with the various computer systems and data transmission means mounted within the C4I assembly 7.0. A further space may be allocated for a pair of removable operator vehicle manipulator grips manual interface assembly 79, to control the autonomous or remote control vehicle, or sensor pod orbs, or other appendages of the system which require direct operator manipulation.

Also provided is a ruggedized, waterproof, backlit, electronic/computer based operator communications display interface assembly 80 with Liquid Crystal Displays (LCD) of existing design which permit the system operator to establish voice or video communications over 8 non-dedicated channels by keying in the appropriate phone number or frequency into the LCD display within the existing telephone network, LF, MF, HF, VHF, UHF, or other SATCOM frequencies means.

A mounting surface for a ruggedized, waterproof, operator sensor and weapons control interface assembly 81 on the C4I assembly provides the system operator and field engineers with a rapidly removed or interchangeable suite of standardized electronic, backlit, hardwired, tactile switches which are slaved to various dedicated control functions required to use the sensor pod means, DLAR/SLAR radar means, weapons system means, air deployed autonomous or remote control vehicle means, or other components of the palletized system.

As part of the C4I assembly, an operator audio and video interface assembly 82 may be provided, comprised of a ruggedized, waterproof headset and/or handset mounted microphone, and speakers, with an extendible/retractable color video camera mounted on top of the flat panel display section within the ruggedized/waterproof console casing assembly 95 and further comprising an optional stand alone marine and terrestrial based antenna, power and geographic reference system which is independent of the aircraft based antenna, sensor pod RAT power, and GPS systems described herein. The stand alone antenna preferably comprises a console dedicated GPS antenna 83 mounted on top of the flat panel display section means, within the ruggedized/waterproof console casing assembly 95, with a further ruggedized, waterproof, console dedicated flat patch satellite communications antenna 84 provided. The flat patch antenna is typical of those manufactured by Magellan, Tecom, or Ball of the U.S.A., for the purposes of transmitting and receiving video, audio, or data telemetry and communications over the INMARSAT, MILSAT, ORBCOM, M-STAR, IRIDIUM, GOES-8, MSAT, or other satellite systems with two standard retractable RF whips of existing design which are fastened in a removable manner to the back of the operator flat panel display section of the console computer case 86. Attachment is accomplished with a detachable, ruggedized, waterproof, console photo voltaic array solar charging assembly 85 means, sandwiched between the back of the operator flat panel display section of the ruggedized/waterproof console casing assembly 95 means, and said console dedicated flat patch satellite communications antenna 84.

The C4I assembly 7.0 further comprised a suite of hardware which is capable of undertaking the various power conversion, processing, and transmission/reception of the previously described audio, video, and data communications and telemetry functions demanded of the C4I assembly 7.0. The hardware may comprise a ruggedized, waterproof, VME, 3U or 6U detachable, console computer case 86, equipped with two or four Motorola power P. C., or Intel Pentium processors, or the like, with a series of conductive cooling fins of conventional design attached in the horizontal, to the outside periphery of the console case.

Additionally, the hardware may comprise ruggedized, waterproof, SUN Sparc engine cases 87, equipped with two dedicated SUN Sparc Processor Boards means, incorporating massively paralleled processing chip set means, using Parallel Algebraic Logic I (PAL-I) algorithms. These algorithms may have been developed previously, or may be the pending Parallel Algebraic Logic 2 (PAL-2) algorithms and chip set means, currently being developed by a team at Lockheed Martin Electronics and Missiles of Florida, U.S.A. and the U.S. Air Force Wright Laboratory Armament Directorate, which uses a Single Instruction, Multiple Data (SIMD) vector based processing architecture means, to achieve extremely high processing and data transfer rates, particularly in graphic or video intensive processing operations, housed within the Console SUN Sparc engine case 87, with a series of conductive cooling fins means of conventional design attached in the horizontal, to the outside periphery of said SUN Sparc Engine Case 87 means.

The C4I assembly may further incorporate a multi-frequency console communications case 88 means, capable of undertaking multi-frequency data, video and audio communications and telemetry. Such means may incorporate eight 3U VME transceiver boards spanning a range of frequencies and communication mediums over the existing telephone network, LF, MF, HF, VHF, UHF, or other SATCOM frequencies including INMARSAT, MILSAT, ORBCOM, M-STAR, IRIDIUM, GOES-8, or MSAT. It may utilize dedicated single frequency 3U VME transceiver boards of existing design or multi-frequency Direct Conversion Receiver (DCM) VHF, UHF, and L Band VME or SEM-E boards comparable to the one developed by Rockwell International of Cedar Rapids, Iowa, USA. for the Joint Strike Fighter (JSF) program and Lockheed-Martin Aeronautical Systems, U.S. Air Force F-16, F-22 Fighter programs, or similar multi band, multi mode, transceivers developed by the U.S. Air force Rome Laboratory, in Rome N.Y., USA. Alternatively, the system may further utilize a Harris Corp. of Rochester, N.Y., USA, Manpack type multi-band radio which works with the ITT/General Dynamics Single Channel Ground and Airborne Radio System (SINCGARS) over VHF-FM, VHF AM/FM, and UHF AM/FM frequencies including satellites links with jam resistant and encrypted functions means, with data from the console and SUN Sparc computer cases, the sensor pod, and the DLAR/SLAR console data relay cable 93 means. Connection to the appendages is effected through a console antenna cable 94, connected to the antenna array console and further utilizing a console Uninterruptible Power Supply (UPS) case 89, equipped with a 220/120 volt AC to DC converter with an array of nickel methyl batteries of existing design which receive and distribute power to the system appendages through a console power supply cable 92 means, and further utilize a console document printer 90 means, and a console document scanner 91 means, to provide data input/output enclosed within the ruggedized/waterproof console casing assembly 95.

METHOD OF OPERATION

Upon receiving notification of a given military or non military civilian based response "situation" from a Rescue Coordination Center (RCC), Mission Control Center, or other military or civilian operations command center, a mission package would be formulated according to the specific requirements of the response effort. An equipment suite would be assembled from the elements of the present invention, and loaded onto a non-dedicated rear loading type, rotary or fixed wing aircraft, which due to the palletized nature of the apparatus of the present invention, facilitates extremely rapid loading characteristics measured in minutes from the moment of response notification to aircraft takeoff. In preparation for the event, during storage, for example, the system further accommodates a self contained outdoor heating and cooling apparatus for the palletized system storage containers which may have to endure sub-zero Arctic, or super-heated, desert type environments while awaiting deployment.

The system can further accommodate a self contained method of loading wherein motorized pallet wheeled mechanism means of existing design are employed with the system pallets for unassisted loading. Assisted loading methodologies would utilize the incorporation of a secondary piece of equipment typical of a front end fork lift, or pallet loading device to place the pallets on board the rear cargo ramp of said C-130 aircraft 96.

The design of the system further accommodates the mounting of the C4I assembly means 7.0, a remote sensing pod 1.0 system sensor pod secondary housing configuration No. 2 2 with an integrated door frame 43, without said observer seat, Sonotube launch mechanism, or observer bubble means, and incorporating an RF and satellite based antenna array 3.0, and further incorporating an integrated door mounted missile detection system 57, shown in FIG. 3, integrated door Mounted missile Countermeasures 58 (MCM), shown in FIG. 3, with the option of using an integrated door Outrigger missile Detection/MCM System 59, shown in FIG. 7, in lieu of having said MCM hardware mounted directly into said door surface.

Upon loading and securing of this optional mission package to one or both sides of the aircraft side door frame, the C4I assembly means 7.0 is retained in the forward part of the aircraft cargo hold while allowing for the integrated door pallet 42 to then be removed, freeing up the majority of the interior of the aircraft for conventional cargo delivery or air extraction exercises. The sensors, antennas, RAT, and MCM hardware is then physically linked to the C4I assembly means 7.0 pallet through the console power supply cable 92 console data relay cable 93, and console antenna cable 94, all shown in FIG. 17.

The system derives its power from a self contained sensor pod Ram Air Turbine (RAT) 7, which in turn provides wind derived mechanical energy to the sensor pod RAT Alternator/Generator 8. If this source of power fails the C4I assembly means 7.0 pallet has the capability to interface with the aircraft electrical system or draw power off its console uninterruptible power (UPS) supply case 89 battery pack to continue mission operations uninterrupted. The electrical power then in turn is distributed to the various system robotics, sensors and other components and to the integrated door hydraulic robotics electric power module 53 and is further coupled to the backup integrated door hydraulic robotics manual power module 54 to effect deployment, retraction, actuation, or other electrical or hydraulic/pneumatic activities necessary to utilize the system and apparatus of the present invention.

When the system is loaded and all systems have been connected within the aircraft, the flight crew or mission operations specialist can elect to have various portions of the system deployed prior to flight, or may undertake such deployment while enroute to, or at, the mission site. While deploying the systems in flight, the aircraft may be slowed down to a minimum flight speed and flown below 10,000 feet unless the crew were wearing oxygen masks. This flight situation would last until the various appendages of the system were fully extended and locked into place, at which time the aircraft could resume normal operations and repressurize the aircraft platform if so desired. A similar procedure would also apply to the process of in flight retraction of the system appendages.

The various appendages utilize a deployment capability consisting of two hydraulic, rotating, and extending/retracting cylinder assemblies, comprising the door sensor pod and DLAR radome robotic armature No. 1 51 and door sensor pod and DLAR radome robotic armature No. 2 52 which extend and retract the sensor pod(s), DLAR radar, SLAR radar, observer door, weapons systems, and antenna arrays in various manners to effect unobstructed deployment through the side aircraft door openings. The varied deployment efforts are accomplished through the use of an integrated door hydraulic robotics electric power module 53 means which is electrically powered and controlled through the C4I assembly means 7.0, or if in the event of system electrical failure, through a backup hand pumped integrated door hydraulic robotics manual power module 54 means, which are both connected to a common sensor pod and antenna array power and hydraulic cable and hose 55 means which transfers the hydraulic force and electrical power to the valves, servos, and actuation devices of the present invention. The system is further controlled by sensor pod and antenna array data relay cables 56, which provide readings on the physical condition, control positions, communications, sensor, targeting, and telemetry data acquired from the various system appendages.

The movement and direction of movement of the appendages is denoted by arrows in FIGS. 8–11, showing how the appendages are deployed from the interior of the aircraft to the exterior of the aircraft through the side door. The aircraft when airborne may utilize a Downward Looking Airborne Radar (DLAR) system and a Side Looking Airborne Radar (SLAR) system which have been designated as the DLAR/SLAR antenna assemblies 2.0. The DLAR assembly is deployed through either side of the aircraft and is first extended generally forward out the side door into the airstream toward the rear of the aircraft while the DLAR radome antenna housing 25 is generally in the vertical position. The DLAR housing is then rotated, and simultaneously lowered below the aircraft fuselage. The door sensor pod and DLAR radome robotic armature No. 1 51 and door sensor pod and DLAR radome robotic armature No. 2 52 are then retracted to bring the DLAR radome antenna Housing 25 toward the center of the aircraft thereby removing the housing from the observer's downward field of view. The system can further accommodate the deployment of a remote sensing pod 1.0 assembly on the opposite side of the aircraft in tandem with the DLAR assembly the remote sensor pod is initially deployed through the side door opening in a generally vertical position and ejected through the doorway in a lateral manner, that is, lateral to the longitudinal axis of the aircraft. This effort is accomplished through extension of the hydraulic cylinders which form a part of the door sensor pod and DLAR radome robotic armature No. 1 51 and door sensor pod and DLAR radome robotic armature No. 2 52. The remote sensor pod is further deployed into the generally horizontal position through the rotation of the door sensor pod and DLAR radome robotic armature No. 1 51 and door sensor pod and DLAR radome robotic armature No. 2 52 assemblies and when rotated 90 degrees, a second motion moves the sensor pod forward mounting strut 12 and sensor pod Rear mounting strut 13 in conjunction with their respective joint assemblies to effect a downward motion which places the sensor pod assembly into a down and locked position below the lower periphery of the aircraft fuselage.

Once deployed, the remote sensor pod is then capable of extending telescopic RF antenna means and deriving electrical power for the entire system from the sensor pod Ram Air Turbine (RAT) 7.

This initial DLAR and sensor pod deployment motion sequence is then followed by the direct lateral movement of the integrated door assembly 4.0 to fill the vacant space left when the original aircraft door was removed, opened or retracted. The integrated door assembly is mounted on an integrated door pallet 42 which serves as a mounting platform for the system and also forms the base of the container which is used to house the assembly when not in use.

The integrated door Frame 43 is fastened to the door sensor pod and DLAR radome robotic armature No. 1 51 and door sensor pod and DLAR radome robotic armature No. 2 52 and is extended in automated sequence and locked in place after the DLAR assembly or the sensor pod assembly(s) is deployed and locked into position. The door frame remains generally inside of, but forms generally a flush surface with the external periphery of the aircraft fuselage but incorporates an integrated door frame primary observation bubble 44 which projects approximately 12 inches into the airstream to provide an extended observers view of the area surrounding the aircraft platform. The observer is seated upon an aircraft certified integrated door observer seat assembly 46 with adjustable leg and arm rests, and further incorporates various ergonomic features, as well as environmental heat and air conditioning controls, to provide an appropriate and comfortable aircraft based manned observation environment.

The observer controls are positioned around the seat assembly and are further incorporated into an integrated door observer seat operator control console 47 which provides a direct operator interface to the C4I assembly means 7.0, providing the system operator with simultaneous viewing of the outside environment while manipulating sensor, autonomous vehicles, communications and other system controls. The seat assembly also provides the operator with the ability to launch a single type "A", "B", or "C" size sensor package through an integrated door Sonotube primary launch assembly means 48 located on the downwind side of the observer seat. The operator may also elect to launch other packages through the Sonotube launch assembly including smoke markers, and illumination flares.

The door assembly also incorporates mechanisms for deployment of an RF and satellite based antenna array 3.0 which enables the systems operators to engage audio, video, and data communications and telemetry over a wide band of frequencies. The antenna array is deployed in a singular upward motion after the door assembly has been inserted into the vacant door frame and locked into position. The antenna array is erected upward and locked into position through activation of a door frame assembly mounted communications and telemetry antenna array strut 35 and communications and telemetry antenna array primary joint 36 which, when activated, lifts the antenna array housing upward and away from said door assembly.

The door frame assembly can also be replaced with an optional integrated door frame secondary observation bubble 45 system which can also be deployed in similar fashion as the primary observation bubble 44 but incorporates a smaller observer viewing area and a more extensive integrated door Sonotube secondary launch assembly 49 and integrated door Sonotube/flare/marker storage rack 50 with further integrated door mounted missile detection system 57, integrated door mounted missile counter measures 58, and integrated door Outrigger missile Detection/MCM System 59.

After the response aircraft has transited to the response or remote sensing survey site, the DLAR, SLAR, and sensor pod based sensor systems are utilized to conduct a multi-spectral scan of the response area to determine the location of various friendly, hostile, or benign targets, or to engage in non-combative remote sensing or photographic activities. While the multi-spectral scan is being conducted, the C4I assembly means 7.0 is used to process or analyze the data into various textural and graphic media which can then be assessed by the system operator. Should a deployed type "A", "B", or "C", Sonotube-compatible sensor package need to be deployed to augment the remote sensing data, the system operator would utilize the door mounted Sonotube launch mechanism to initiate a GPS-coordinated push button deployment effected from the system operator's seat. The C4I assembly means 7.0 then uses data supplied from the sensor pod and antenna mounted GPS, altimeter and Pitot tube means to calculate aircraft altitude, aircraft speed, GPS position, wind speed and direction to accurately determine where each armed intervention, Sonotube sensing package, autonomous or remote controlled vehicle, or other deployment package was ejected from the deployment aircraft and where it is estimated to have impacted or landed.

The Sonotube data can relay water temperature, salinity, conductivity, surface wind speed, surface wind direction, or other data from marine or terrestrial based environments. The Sonotube deployment system can also be used to deploy smoke markers to visibly mark the location of a given target or drop zone, or can also be used to deploy illumination flares capable of providing a slow descent, bright burning flare in the visible light spectrum, or an electric light in the infrared or ultraviolet spectrums to enhance specific spectral sensor detection capabilities.

Once an assessment of the emergency or non-emergency situation has been made, the system operator can then initiate the proper command sequence for communications between the target, land, air, and sea resources, and land, air, and sea based command center(s), which will assist in selecting, positioning, and deploying the optimum response. Should further clarification of the subject targets be required, the sensor pod tracking orb(s) 4 can be manipulated to track the targets either manually or automatically through the use of an advanced Image Recognition Chip (IRC) typical of that produced by Litton Electronics of California, USA and incorporated into the C4I assembly 7.0.

Figure 19:
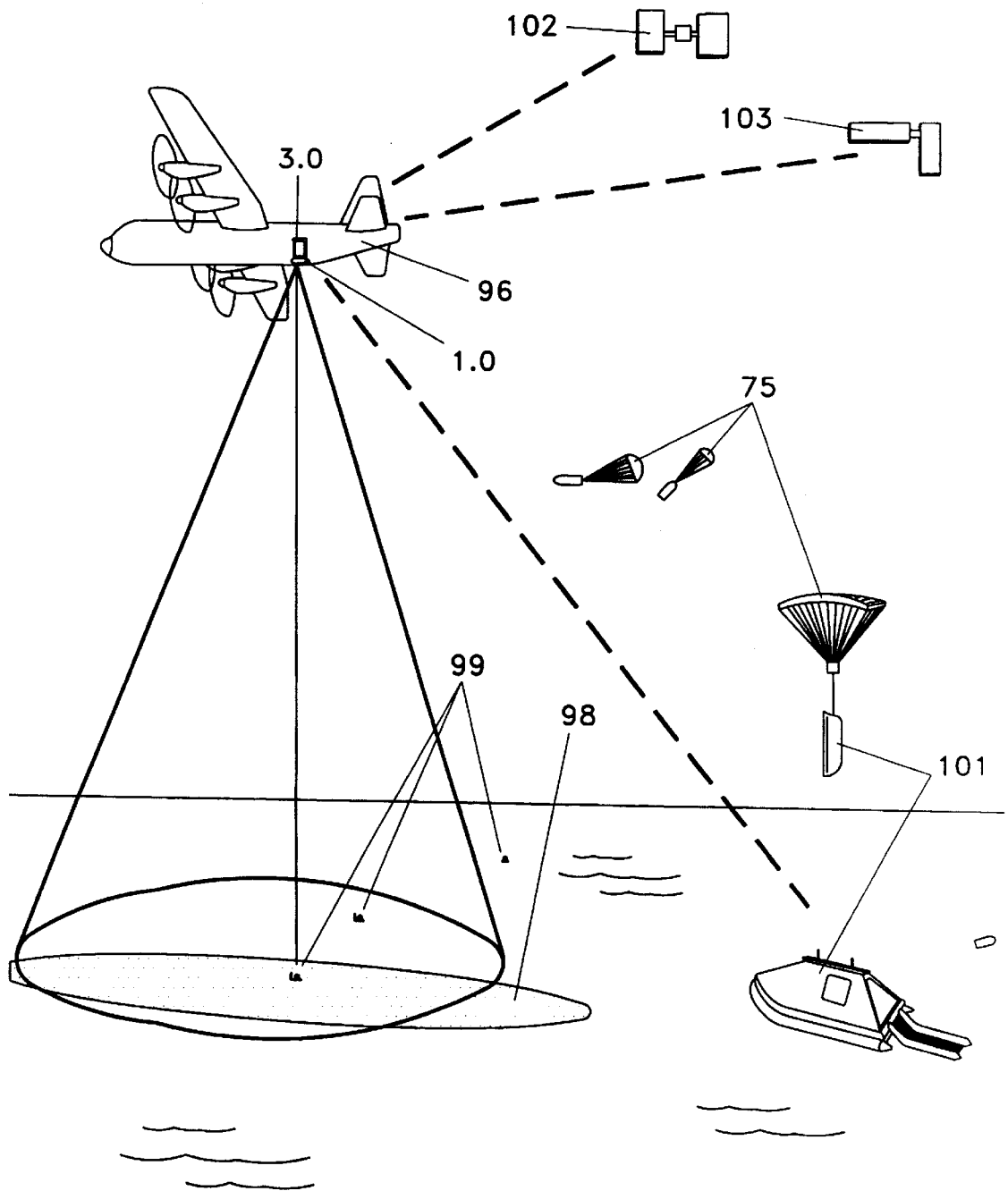
FIG. 19 is a perspective scenario of complete system apparatus mounted on a Lockheed C-130 aircraft with air deployed autonomous vehicle means, engaged in search and rescue activities.
Figure 20:
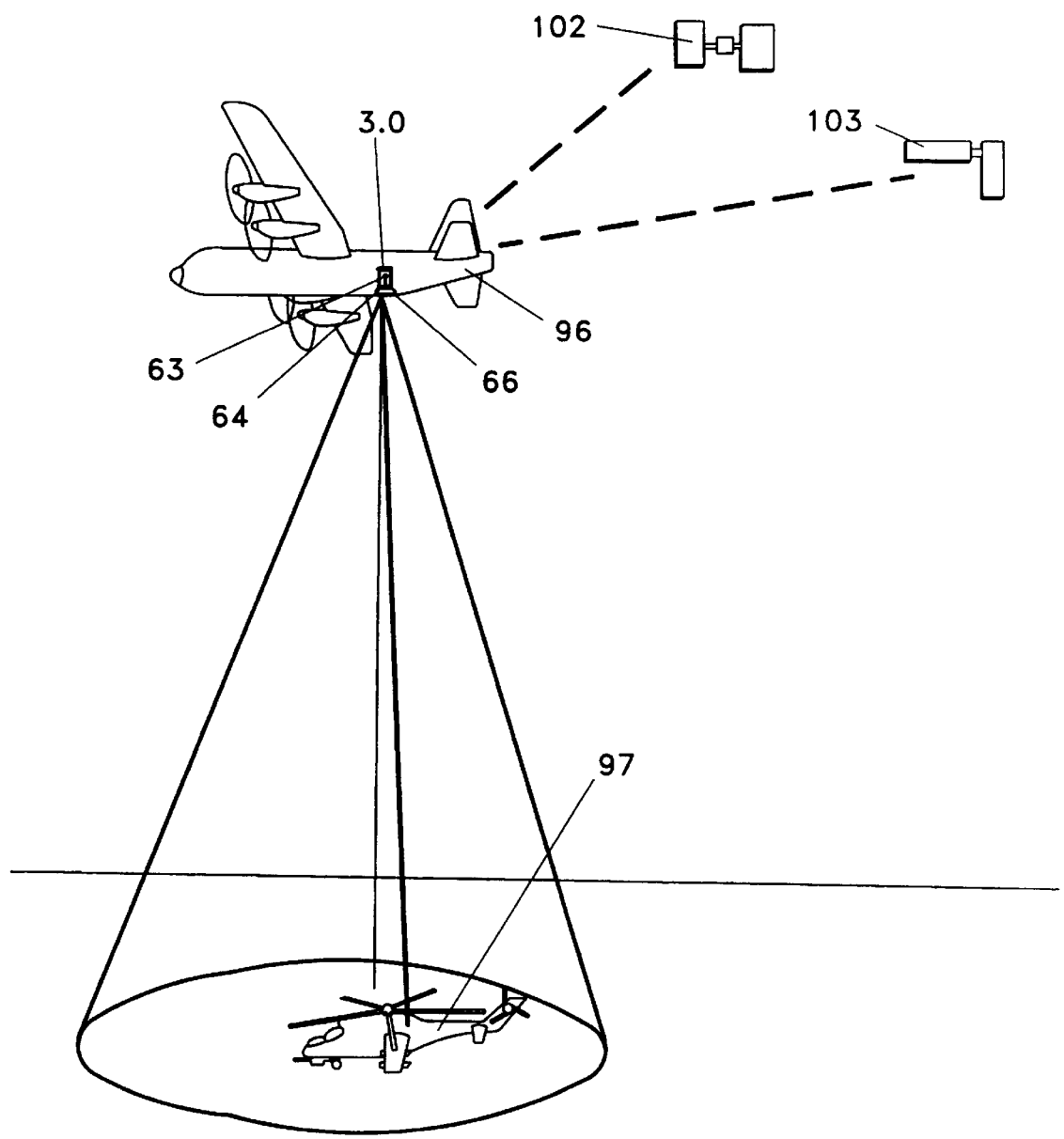
FIG. 20 Is a perspective scenario of complete system apparatus mounted on a Lockheed C-130 aircraft engaged in combative military activities.

As shown in FIG. 19, the response can include the deployment of various air deployed vehicles which are ejected through the rear of the aircraft platform using either a standard non guided parachute assembly or using a precision GPS guided Air Deployment Parachute assembly 75. The vehicles can include various terrestrial or marine autonomous or remote controlled vehicle 101 to effect the rescue of persons in peril, to detect toxic spills, to detect biological/chemical contaminants, to contain, remediate, recover and store the contaminants, to detect land or sea mines, to remediate the mines, to deliver supplies to surface based emergency civilian or combative military personnel, or for other mission specific applications necessitating the air deployment of some form of robotic vehicle system.

Further response could employ tasking various land, sea, or air based assets to assist in the recovery of persons in peril, to apprehend criminals, to direct or implement an armed combative response or other type of mission specific request best optimized through another asset other than the deployment aircraft. The system operator can effect control over the deployed vehicles using a line of sight methodology while observing the tactical area and directing the air deployed vehicles to carry out their mission programming while simultaneously receiving video and vehicle systems, navigational, communications/video, and telemetry data through the communications and telemetry antenna array airfoil antennas 38 and communications and telemetry antenna array retractable whips 39 while seated at the integrated door observer seat assembly 46 through the integrated door observer seat operator control console 47 mounted on the observer seat arm rest, and connected to the C4I assembly means 7.0. Under Instrument Flying Regulations (IFR) type flying conditions, or other line of sight prohibiting environmental constraints, the system operator can receive the vehicle systems, navigational, communications/video, and telemetry data to effect control of the vehicle systems by remote video and can relay control of the vehicles to a distant command center by satellite 102 using the communications and telemetry antenna array SATCOM antenna 40 which comprises part of the RF and satellite based antenna array 3.0 assembly means.

The deployment aircraft could also be used as a tactical standoff delivery weapons platform to administer a combative response employing, for example, an automatic 25 MM Gatling gun assembly 63, a 40 MM armor piercing cannon assembly 64 or air-to-ground missile systems in the modified door Type "A" Sonotube ASM missile launch assembly 65 to neutralize hostile ground and marine based targets. The targeting and fire control systems may employ either direct manual control over the weapons system or utilize a GPS correlated computer guided targeting and fire control system to effect delivery of the weapons payload. Under such hostile environments the sensor pod can be equipped with a sensor pod missile detection/countermeasures assembly 66 to protect the aircraft from ground, air, and sea launched anti aircraft missiles.

In situations where the deployment aircraft necessitates utilization of the aircraft's cargo bay, and a sensing/tracking capability is required, the C4I assembly 7.0. pallet can be loaded into the forward part of the cargo hold occupying as little as five lineal feet of aircraft length in conjunction with a modified, integrated door frame 43 assembly that is mounted in conjunction with a sensor pod secondary housing—configuration 2 2 to give the aircraft a basic sensing capability without using the entire cargo bay. Further, the modified door frame could accommodate an integrated door mounted missile detection system 57 and integrated door Mounted missile Countermeasures System 58, or a combined integrated door outrigger missile detection/MCM system 59 without the need to retain the aircraft loading pallet, thereby freeing interior space for conventional cargo and air deployment type activities.

Further applications of the modified, integrated door frame 43 assembly mounted in conjunction with a sensor pod secondary housing—configuration 2 2 without the mounting pallet would also include aerial fire fighting or oil spill spraying wherein the cargo space of the aircraft platform is utilized by an ADDSPAC oil spraying system typically used by Southern Air Transport, or the MAVS water based fire retardant drop system used by the U.S. National Guard and U.S Forest Service. The spray and retardant systems may be utilized in conjunction with the C4I assembly 7.0 pallet to analyze the sensor data to effect accurate target assessment and deployment of the remediation and retardant agents.

Upon completing the mission sensing, targeting, and response delivery, the C-130 aircraft 96 platform may return to its designated base with the option of retracting the various aircraft based modular, palletized, sensing, detection, targeting, communications and response apparatus. Upon returning home, the aircraft further possesses a geographic and chronologically based sensor information, audio, and video, database of the mission activities for post mission analysis.

I claim:

1. An apparatus adapted for use in an aircraft, said aircraft having a floor, an interior, an exterior, and at least one removable side door member, said apparatus comprising:
   a) a pallet assembly adapted for mounting to said floor of said interior of said aircraft adjacent said door member;
   b) an integrated door assembly moveably mounted to said pallet assembly and adapted to fit into an opening in said aircraft upon removal of said side door member, said integrated door assembly having a door frame defining a periphery; and
   c) at least one retractable member moveably attached to said door frame such that said retractable member can be deployed from said interior of said aircraft to said exterior of said aircraft.

2. The apparatus of claim 1, wherein said retractable member comprises at least one remote sensing pod.

3. The apparatus of claim 1, wherein said retractable member comprises at least one radar member.

4. The apparatus of claim 1, wherein said retractable member comprises at least one antenna array.

5. The apparatus of claim 1, wherein said door frame comprises an observation bubble, said observation bubble originating substantially at said periphery and projecting to said exterior of said aircraft.

6. The apparatus of claim 1, wherein said door frame comprises an integrated weapons assembly.

7. The apparatus of claim 1, wherein said door frame comprises means for Sonotube launching of projectiles.

8. The apparatus of claim 1, wherein said apparatus comprises means for coordinating the members and functions of said apparatus.

9. The apparatus of claim 1, wherein said apparatus comprises a seating assembly moveably mounted to said pallet assembly.

* * * * *